US011803285B2

United States Patent
Fujioka

(10) Patent No.: US 11,803,285 B2
(45) Date of Patent: *Oct. 31, 2023

(54) COORDINATE INPUT DEVICE WITH CONTROLLER ARRANGED INSIDE OF REGION COVERED WITH SHIELD SHEET

(71) Applicant: Wacom Co., Ltd., Saitama (JP)

(72) Inventor: Hiroshi Fujioka, Saitama (JP)

(73) Assignee: Wacom Co., Ltd., Saitama (JP)

( * ) Notice: Subject to any disclaimer, the term of this patent is extended or adjusted under 35 U.S.C. 154(b) by 148 days.

This patent is subject to a terminal disclaimer.

(21) Appl. No.: 17/353,291

(22) Filed: Jun. 21, 2021

(65) Prior Publication Data

US 2021/0311576 A1 Oct. 7, 2021

Related U.S. Application Data

(63) Continuation of application No. 16/851,944, filed on Apr. 17, 2020, now Pat. No. 11,079,892, which is a continuation of application No. 15/850,968, filed on Dec. 21, 2017, now Pat. No. 10,664,093, which is a continuation of application No. PCT/JP2015/071450, filed on Jul. 29, 2015.

(51) Int. Cl.
*G06F 3/046* (2006.01)
*G06F 3/041* (2006.01)
*G06F 3/044* (2006.01)
*G06F 3/0354* (2013.01)

(52) U.S. Cl.
CPC .......... *G06F 3/046* (2013.01); *G06F 3/03545* (2013.01); *G06F 3/0442* (2019.05); *G06F 3/04162* (2019.05); *G06F 2203/04107* (2013.01)

(58) Field of Classification Search
CPC .............. G06F 3/046; G06F 3/04162; G06F 2203/04107; G06F 3/03545; G06F 3/0442
See application file for complete search history.

(56) References Cited

U.S. PATENT DOCUMENTS 5,629,499 A 5/1997 Flickinger et al.
6,691,233 B1 2/2004 Gannage et al.
(Continued)

FOREIGN PATENT DOCUMENTS

JP 4-74330 A 3/1992
JP 8-213818 A 3/1992
(Continued)

*Primary Examiner* — Kwang-Su Yang
(74) *Attorney, Agent, or Firm* — Seed IP Law Group LLP

(57) ABSTRACT

A coordinate input device including a coordinate sensor and a wireless communication circuit that wirelessly transmits coordinate data, etc. to an external electronic device is realized without affecting coordinate detection by the coordinate sensor and without impeding downsizing of the coordinate input device. A shield sheet (1C) is provided to cover the whole of a surface (back surface) of a sensor (1B) opposite to a sensor input surface (front surface) facing an electronic pen. A controller (200) that controls transmission of the coordinate data detected by the sensor (1B) to the external electronic device is disposed facing the sensor (1B) with the shield sheet (1C) disposed between the sensor and the controller, and a transmission antenna connected with the controller (200) is arranged outside a region covered with the shield sheet (1C).

19 Claims, 10 Drawing Sheets

(56) References Cited

U.S. PATENT DOCUMENTS

| | | |
|---|---|---|
| 6,816,152 B2 | 11/2004 | Yanagisawa |
| 8,149,220 B2 | 4/2012 | Fukushima et al. |
| 2006/0146031 A1 | 7/2006 | Wang et al. |
| 2007/0097098 A1 | 5/2007 | Yoshino |
| 2008/0042985 A1 | 2/2008 | Katsuhito et al. |
| 2012/0088554 A1 | 4/2012 | Lee et al. |
| 2012/0162127 A1 | 6/2012 | Onoda |
| 2013/0021261 A1 | 1/2013 | Wilson et al. |
| 2013/0335370 A1 | 12/2013 | Heo et al. |
| 2014/0267951 A1 | 9/2014 | Lee et al. |
| 2015/0015499 A1 | 1/2015 | Park |
| 2015/0062479 A1 | 3/2015 | Shin et al. |
| 2015/0111612 A1* | 4/2015 | Yaghmour ............ G06F 1/1632 455/557 |
| 2016/0018854 A1* | 1/2016 | Yu ........................ G06F 1/1669 361/679.08 |
| 2016/0234356 A1 | 8/2016 | Thomas et al. |

FOREIGN PATENT DOCUMENTS

| | | |
|---|---|---|
| JP | 5-189379 A | 7/1993 |
| JP | 7-44304 A | 2/1995 |
| JP | 7-200134 A | 8/1995 |
| JP | 7-295722 A | 11/1995 |
| JP | 8-171455 A | 7/1996 |
| JP | 9-330170 A | 12/1997 |
| JP | 2003-67122 A | 3/2003 |
| JP | 2004-102985 A | 4/2004 |
| JP | 2009-3796 A | 1/2009 |
| JP | 2015-49506 A | 3/2015 |
| TW | 200500925 A | 1/2005 |

\* cited by examiner

FIG. 3A
LOWER SURFACE
(SURFACE FACING SENSOR COVER 1D)
FIG. 3B
UPPER SURFACE
(SURFACE FACING SHIELD SHEET 1C)
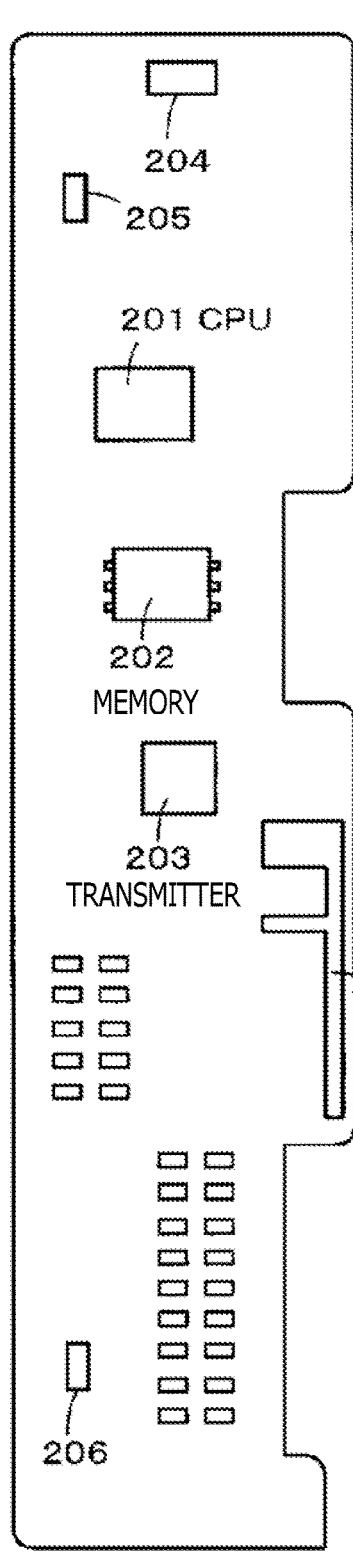
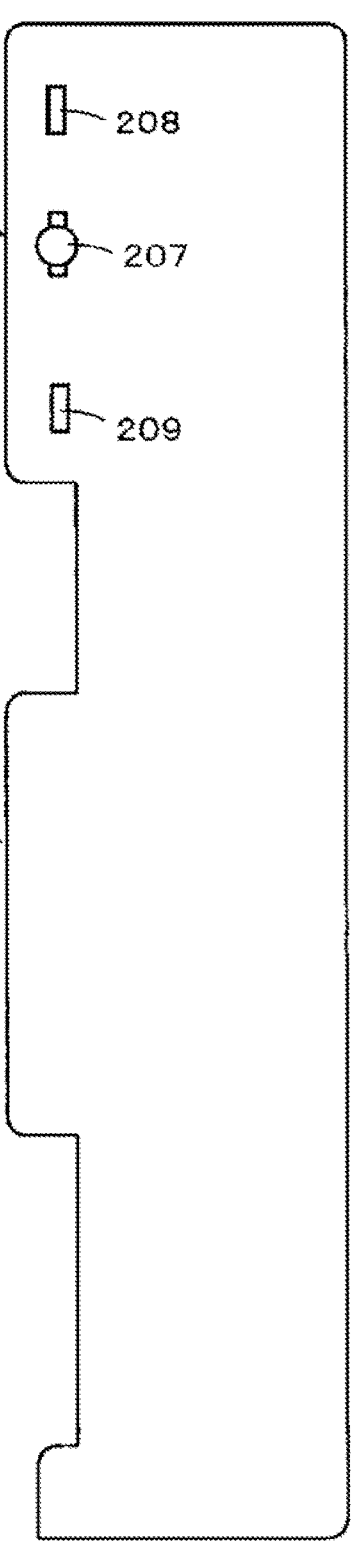

FIG. 4
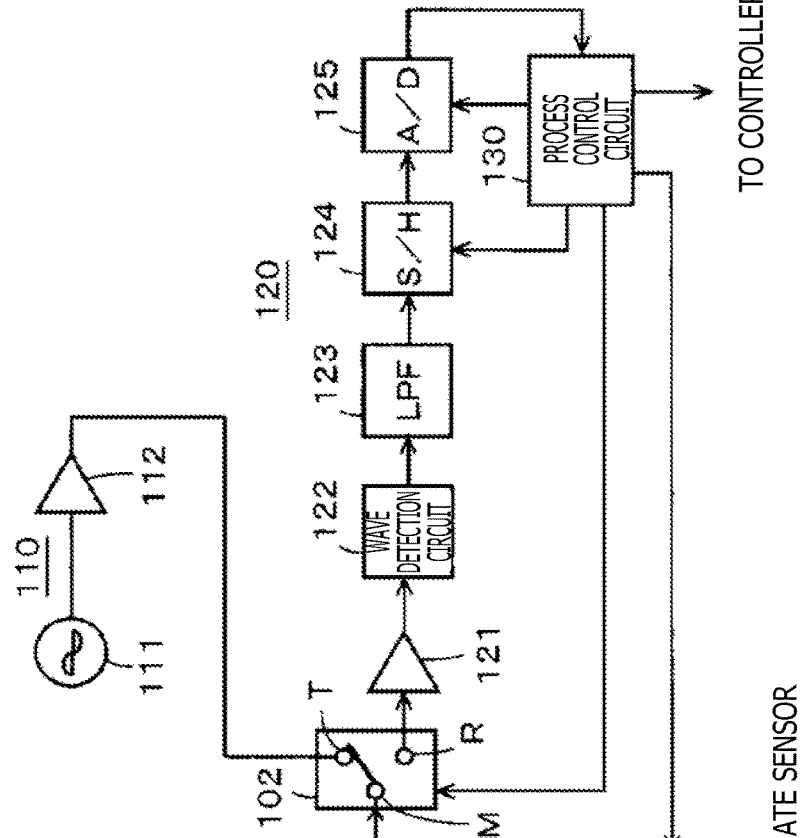
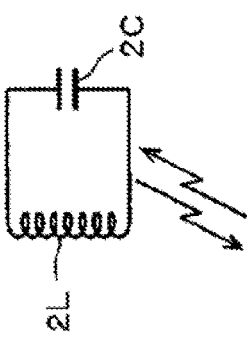
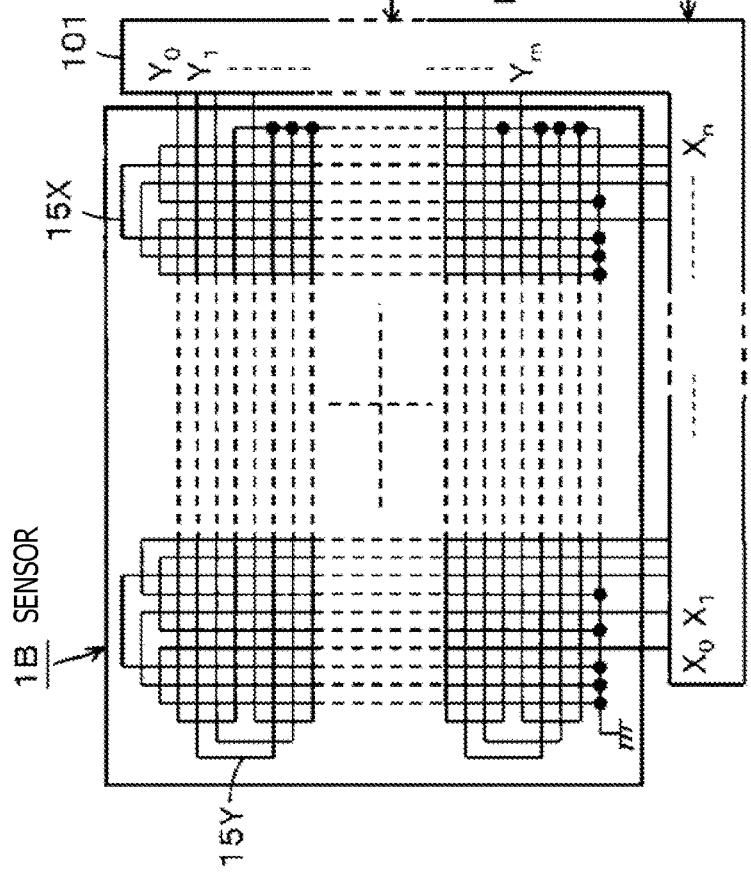

COORDINATE INPUT DEVICE WITH CONTROLLER ARRANGED INSIDE OF REGION COVERED WITH SHIELD SHEET

BACKGROUND

Technical Field

The present disclosure relates to a coordinate input device including a coordinate sensor of an electromagnetic induction type or a capacitive coupling type, for example, and having a function of transmitting information representing detected coordinates to an external electronic device.

Background Art

A coordinate input device (position input device) including a coordinate sensor of an electromagnetic induction type or a capacitive type and receiving input of a coordinate position indicated by use of an electronic pen is used as an input device for inputting information to a personal computer. Examples of the coordinate sensor of the electromagnetic induction type are disclosed in literature like Patent Document 1 mentioned later, and examples of the coordinate sensor of the capacitive type are disclosed in literature like Patent Document 2 mentioned later. The transmission (transfer) of coordinate data (position data) from such a coordinate input device to a personal computer recently tends to be carried out by means of wireless communication. For example, communication methods according to various wireless communication standards, such as the Bluetooth (registered trademark) standard, the wireless fidelity (Wi-Fi) (registered trademark) standard, and the infrared data association (IrDA) standard using infrared rays, are currently employed.

Among the communication methods according to various wireless communication standards, employing a communication method using radio waves having a lower frequency (longer wavelength) than infrared rays can cause a problem. For example, when a communication method according to the Bluetooth (registered trademark) standard or the Wi-Fi (registered trademark) standard is employed, it appears that the radio waves transmitted from the coordinate input device to the personal computer can interfere with signals communicated between the electronic pen and the coordinate sensor. It also appears that a wireless communication circuit for transmitting data from the coordinate input device to the personal computer can act as a source of noise affecting the coordinate sensor. Therefore, the wireless communication circuit has to be arranged at a sufficient distance from the coordinate sensor.

PRIOR ART DOCUMENT

Patent Documents

Patent Document 1: Japanese Patent Laid-Open No. 1995-044304
Patent Document 2: Japanese Patent Laid-Open No. 1995-295722

BRIEF SUMMARY OF DISCLOSURE

Technical Problems

However, downsizing of the coordinate input devices in recent years is making it difficult to arrange the wireless communication circuit, for transmitting the coordinate data from the coordinate input device to a personal computer, at a sufficient distance from the coordinate sensor. Further, in consideration of promoting the downsizing of the coordinate input devices and cost reduction, it is desirable to make it possible to use a substrate on which the wireless communication circuit and a transmission antenna are compactly integrated together. If such a substrate is usable, simplification of the manufacturing process is also possible since steps for connecting the wireless communication circuit and the transmission antenna can be left out.

In consideration of the above-described situation, an object of the present disclosure is to realize a coordinate input device including a coordinate sensor and a wireless communication circuit that wirelessly transmits coordinate data, etc. to an external electronic device without affecting coordinate detection by the coordinate sensor and without impeding downsizing of the coordinate input device.

Technical Solution

To resolve the above-described problems, a coordinate input device according to the disclosure described in claim 1 includes a sensor, a top plate, a shield sheet, a coordinate data formation circuit, and a controller. The sensor detects coordinates corresponding to a position indicated by an electronic pen. The top plate covers an input surface of the sensor. The shield sheet has electrical conductivity and magnetic properties, and is provided to cover a whole of a surface of the sensor opposite to the input surface of the sensor. The coordinate data formation circuit forms coordinate data based on detection output of the sensor in response to an operation input via the top plate. The controller is connected with a transmission antenna and faces the sensor with the shield sheet disposed between the sensor and the controller, and performs control to hold the coordinate data formed by the coordinate data formation circuit and to wirelessly transmit the coordinate data to an external device. The transmission antenna connected with the controller is arranged outside of a region covered with the shield sheet.

In the coordinate input device according to the disclosure described in claim 1, the top plate is provided to cover the input surface (front surface) of the sensor facing the electronic pen. Further, the shield sheet shields the sensor from radio waves and absorbs leakage of magnetic fluxes generated by the sensor and is provided to cover the whole of the surface (back surface) of the sensor opposite to the input surface. The controller performs control to transmit the coordinate data, formed by the coordinate data formation circuit based on the detection output of the sensor in response to the operation input via the top plate, to the external electronic device. The controller is arranged facing the sensor with the shield sheet disposed between the controller and the sensor, and the transmission antenna connected with the controller is arranged outside the region covered with the shield sheet.

With this configuration, unnecessary radiation and the like from the controller can be screened out by the shield sheet and the leakage of magnetic fluxes from the sensor can be absorbed by the shield sheet, and thus the controller can be provided in the vicinity of the sensor facing the sensor. Further, since the transmission antenna connected with the controller is arranged outside the region covered with the shield sheet, the radio waves emitted from the transmission antenna can be appropriately transmitted to the external electronic device without being screened out by the shield sheet. In this case, the transmission antenna has directivity to emit the radio waves towards the external electronic device, and thus the radio waves transmitted from the transmission antenna can be prevented from interfering with the signals communicated between the electronic pen and the sensor or leaking into the sensor.

Advantageous Effect

According to the present disclosure, a coordinate input device including a coordinate sensor and a wireless communication circuit that wirelessly transmits coordinate data, etc. to an external electronic device can be realized without affecting the coordinate detection by the coordinate sensor and without impeding the downsizing.

BRIEF DESCRIPTION OF THE DRAWINGS

[FIGS. 3A and 3B]

FIGS. 3A and 3B depict diagrams for explaining a general configuration of a controller 200.

FIG. 4 is a diagram for explaining a configuration example of a coordinate sensor 1S of an electromagnetic resonance type.

FIGS. 11A, 11B, and 11C depict diagrams for explaining a concrete mode of usage of the coordinate input device 7.

DETAILED DESCRIPTION

Embodiments of the coordinate input device according to the present disclosure will be described below with reference to drawings. In the following embodiments, description will be given of a coordinate input device of the so-called stand-alone type which can be used separately and coordinate input devices of the combined use type which are used in combination with a personal computer of the tablet type (hereinafter referred to simply as a tablet personal computer (PC)).

First Embodiment

External Appearance and Basic Configuration of Coordinate Input Device 1

Figure 1:
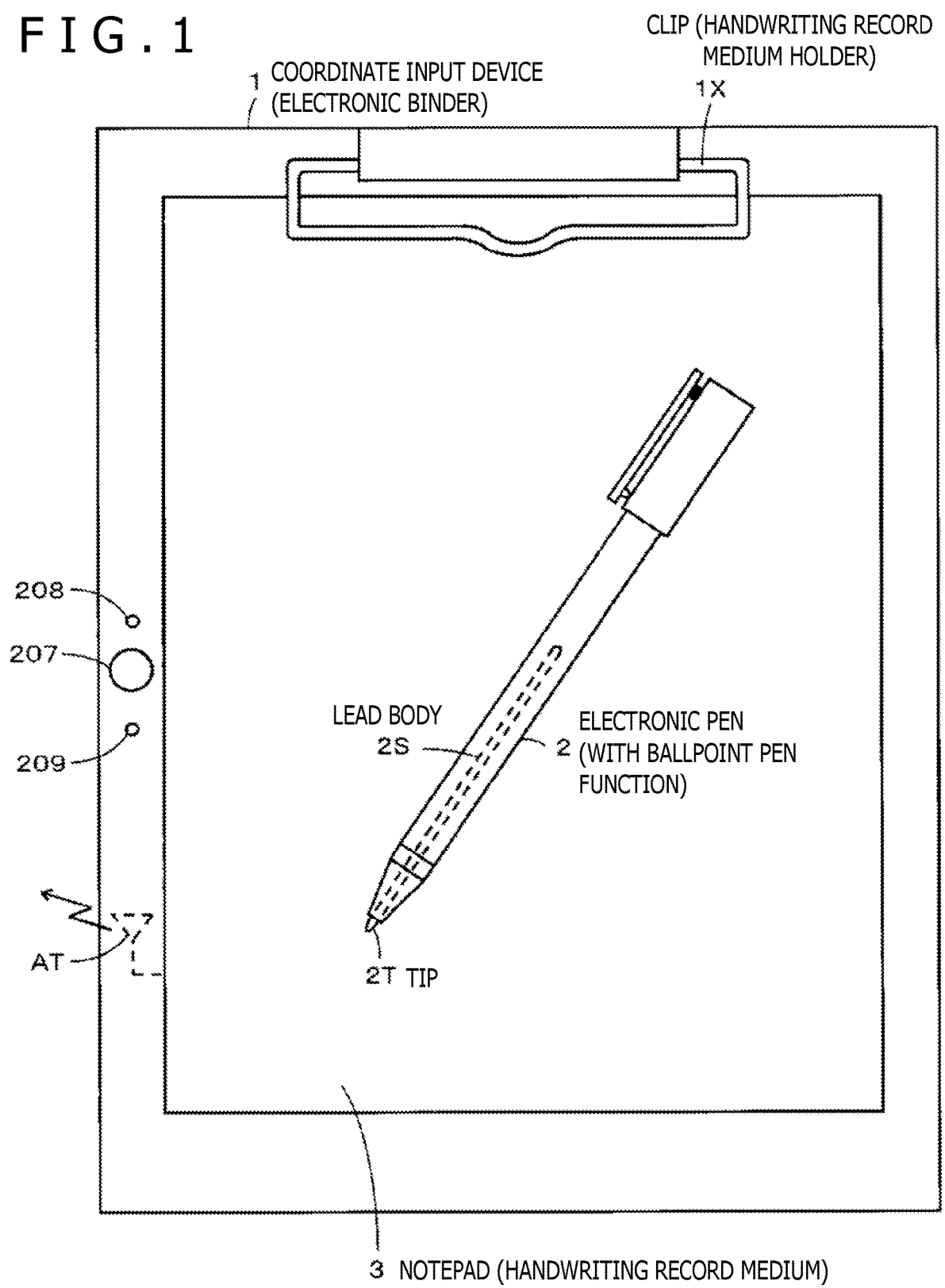
FIG. 1 is a diagram for explaining an external appearance of a coordinate input device 1 according to a first embodiment of the present disclosure.

FIG. 1 is a diagram for explaining external appearance of a coordinate input device 1 according to a first embodiment.

The coordinate input device 1 in the first embodiment is a device of the stand-alone type which can be used separately. As depicted in FIG. 1, the coordinate input device 1 has a clip (handwriting record medium attachment part) 1X, for clipping a notepad 3 and fixing the notepad 3 on the coordinate input device 1, in its upper end and has external appearance similar to the widely used stationery called a binder or the like. Incidentally, the binder as stationery can also be called a clipboard, a writing board, etc.

In the present embodiment, a coordinate sensor 1S of the electromagnetic resonance (EMR) type is installed in the coordinate input device 1, by which the device is configured as an electronic binder. Coordinate data can be inputted to the coordinate input device 1 by using an electronic pen 2. As will be explained later, the electronic pen 2 has a function of cooperating with the coordinate sensor 1S installed in the coordinate input device 1 and thereby repeatedly transmitting a signal receivable by the coordinate sensor 1S (coordinate indication function). Further, the electronic pen 2 includes a lead body 2S filled with ink and a tip (pen point) 2T provided at the tip end of the lead body and thereby has a function of being capable of leaving handwriting on a handwriting record medium such as a paper medium (ballpoint pen function).

On the notepad (writing pad) 3 fixed on the coordinate input device 1 with the clip 1x as depicted in FIG. 1, characters, symbols, etc. can be written and drawn by using the ballpoint pen function of the electronic pen 2. In this case, handwriting with the ink is left on the notepad 3 by the ballpoint pen function of the electronic pen 2. At the same time, due to the signal transmitted from the electronic pen 2 to the coordinate sensor 1S by the coordinate indication function of the electronic pen 2, coordinate data corresponding to the handwriting formed on the notepad 3 are detected by the coordinate sensor 1S and accumulated in a memory as electronic data.

While details will be explained later, the coordinate input device 1 is configured to be capable of wirelessly transmitting the coordinate data (handwriting data) accumulated in the memory of the coordinate input device 1 to an external electronic device such as a personal computer via a controller and a transmission antenna AT installed in the coordinate input device 1. Thus, the information recorded on the handwriting record medium such as a paper medium can be taken in as the coordinate data (handwriting data) in real time and used without the trouble of specially taking in the information as electronic data by using an image reader.

A left edge of the coordinate input device 1's surface facing the electronic pen 2 is provided with an operation button 207 and light emitting diodes (LEDs) 208 and 209. The operation button 207 is for receiving operation inputs from the user, and the LEDs 208 and 209 are for notifying the user of information such as the operating status of the coordinate input device 1. The operation button 207 is a manipulandum operated when the user turns on/off the power, transmits the coordinate data taken in, or the like, for example.

Basic Structure of Coordinate Input Device 1

Figure 2:
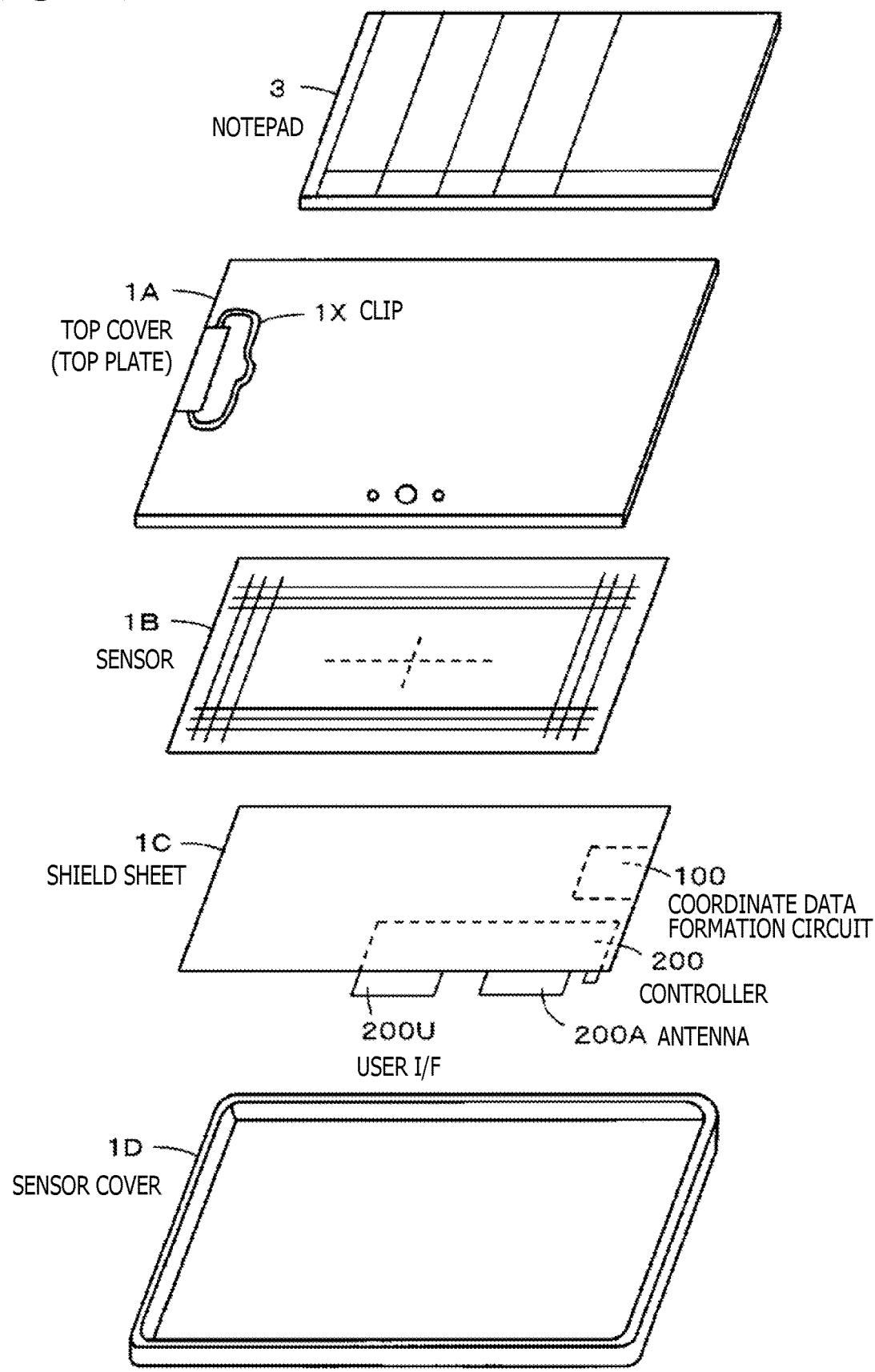
FIG. 2 is a diagram for explaining a basic structure of the coordinate input device 1.

FIG. 2 is a diagram for explaining a basic structure of the coordinate input device 1. As depicted in FIG. 2, the coordinate input device 1 mainly includes a top cover (top plate) 1A, a sensor 1B that detects coordinates, a shield sheet 1C, and a sensor cover 1D from above. The sensor cover 1D situated at the bottom is formed of synthetic resin or metal, for example. In the present embodiment, the sensor cover 1D is configured to have a base and side faces (side walls) of a prescribed height formed around the base as depicted in FIG. 2. Thus, the top of the sensor cover 1D is an opening. The shield sheet 1C and the sensor 1B are stored in the sensor cover 1D through the opening at the top of the sensor cover 1D.

The areas of the shield sheet 1C and the sensor 1B are smaller than the area of the opening of the sensor cover 1D. The shield sheet 1C is formed by bonding an electromagnetic sheet made of a magnetic material to a conductive sheet made of indium tin oxide (ITO), zinc oxide, tin oxide or the like, for example. The shield sheet 1C is provided so as to cover the whole of a surface of the sensor 1B opposite to the side facing the electronic pen 2 (i.e., a surface facing the sensor cover 1D).

The conductive sheet of the shield sheet 1C serves to prevent unnecessary signals from leaking into the sensor 1B. Meanwhile, the electromagnetic sheet of the shield sheet 1C serves to eliminate the leakage of magnetic fluxes generated in the sensor 1B. Incidentally, in the present embodiment, the shield sheet 1C has a slightly larger area than the surface (lower surface) of the sensor 1B on the sensor cover 1D's side. The shield sheet 1C may also be a member like a film or a plate.

While the detailed configuration of the sensor 1B will be explained later, the sensor 1B is basically configured to include a great number of linear conductors (loop coils) for transmitting signals to the electronic pen 2, receiving signals from the electronic pen 2, and so forth. The top cover 1A can be formed of material allowing through the signals transmitted from the electronic pen 2, such as various types of synthetic resin. The top cover 1A has a slightly larger area than the top of the sensor cover 1D and is capable of covering the whole of the top of the sensor cover 1D. With this configuration, the top of the sensor cover 1D is sealed up with the top cover 1A, and the components like the sensor 1B and the shield sheet 1C are prevented from coming out of the sensor cover 1D.

As well as synthetic resin, the top cover 1A can be formed of various materials having permeability to radio waves, such as glass and ceramic. As depicted also in FIG. 1, the upper end of the top cover 1A is provided with the clip 1x formed of metal or the like, for example, which makes it possible to hold the notepad 3 on the top cover 1A (i.e., on the coordinate input device 1). To sum up, the top cover 1A covers and protects the sensor 1B while also functioning as a top plate on which the notepad 3 is set.

Further, as depicted in FIG. 2 together with the shield sheet 1C, a coordinate data formation circuit 100 and a controller 200 are provided to face the sensor 1B across the shield sheet 1C. The coordinate data formation circuit 100 forms the coordinate data based on the detection output from the sensor 1B. The controller 200 mainly implements a control function of accumulating the coordinate data formed by the coordinate data formation circuit 100 in the memory, transmitting the accumulated coordinate data to the external electronic device such as a personal computer, and so forth.

In the present embodiment, the coordinate data formation circuit 100 and the controller 200 are circuit boards formed by mounting electronic components, integrated circuits, metallic wiring connecting the electronic components and the integrated circuits, and so forth at high density on a plate-like member made of resin or the like. By placing the shield sheet 1C in between as depicted in FIG. 2, even if the coordinate data formation circuit 100 and the controller 200 are arranged in the close vicinity of the sensor 1B to face the sensor 1B, signals emitted (radiated) from these circuit boards can be prevented from leaking into the sensor 1B. Further, the signals emitted (radiated) from the coordinate data formation circuit 100 and the controller 200 can be prevented from interfering with the signals communicated between the sensor 1B and the electronic pen 2. Furthermore, the shield sheet 1C eliminates the leakage of magnetic fluxes generated in the sensor 1B and prevents the magnetic fluxes from affecting the coordinate data formation circuit 100 and the controller 200.

While details will be explained later, the transmission antenna is provided integrally with the controller 200 configured as the circuit board. However, if the transmission antenna is also covered with the shield sheet 1C, it is impossible to appropriately transmit the coordinate data, etc. to the external electronic device. Thus, in the coordinate input device 1 in the present embodiment, an antenna assembly 200A on the controller 200, in which the transmission antenna is arranged, is provided outside the region covered with the shield sheet 1C.

Specifically, as indicated by dotted lines in FIG. 2 together with the shield sheet 1C, part of the controller 200 is provided so as to face the sensor 1B across the shield sheet 1C. However, the antenna assembly 200A in which the transmission antenna of the controller 200 is arranged is provided so as to protrude from the outer edge of the shield sheet 1C. With this configuration, the transmission antenna provided on the controller 200 is prevented from being covered with the shield sheet 1C and appropriate transmission of the coordinate data to the external electronic device is made possible.

Incidentally, the directivity of the transmission antenna provided in the antenna assembly 200A is set in an outward direction opposite to the side on which the sensor 1B is situated (inward direction). With this setting, the signals transmitted from the transmission antenna can be inhibited from leaking into the sensor 1B, interfering with the signals communicated between the sensor 1B and the electronic pen 2, and so forth.

Further, as mentioned earlier, the coordinate input device 1 is also provided with the operation button 207 used for indicating the turning on/off of the power and the execution of the transmission of the coordinate data and the LEDs 208 and 209 for notifying information such as the operating status. However, if the operation button 207 and the LEDs 208 and 209 are also covered with the shield sheet 1C, the user cannot operate the operation button 207 or check the status of the LEDs. Thus, in the coordinate input device 1 in the present embodiment, a user interface (hereinafter described as a "user I/F") 200U on the controller 200, in which the operation button 207 and the LEDs 208 and 209 are arranged, is provided outside the region covered with the shield sheet 1C.

Specifically, as explained above with reference to FIG. 2, part of the controller 200 is provided so as to face the sensor 1B across the shield sheet 1C as indicated by the dotted lines in FIG. 2 together with the shield sheet 1C. In contrast, the user I/F 200U in which the operation button 207 and the LEDs 208 and 209 of the controller 200 are arranged is provided so as to protrude from the outer edge of the shield sheet 1C. With this configuration, the operation button 207 and the LEDs 208 and 209 provided on the controller 200 are prevented from being covered with the shield sheet 1C, which makes it possible to appropriately receive operation inputs from the user and to appropriately notify the user of information such as the operating status of the device itself.

The coordinate input device 1 in the present embodiment is used by setting the notepad 3 on a top surface of the top cover 1A as depicted in FIG. 2, fixing the notepad 3 with the clip 1X, and recording handwriting on the notepad 3 by using the electronic pen 2.

Configuration of Controller 200

FIGS. 3A and 3B depict diagrams for explaining a general configuration of the controller 200. FIG. 3A depicts the condition of a surface (lower surface) of the controller 200 facing the sensor cover 1D. FIG. 3B is a diagram for explaining the condition of a surface (upper surface) of the controller 200 facing the shield sheet 1C. As depicted in FIGS. 3A and 3B, the controller 200 is configured as a long and narrow circuit board having two long sides and two short sides. The user I/F 200U and the antenna assembly 200A are provided on one long side as two protruding parts. The user I/F 200U is provided with the operation button 207 and the LEDs 208 and 209. The antenna assembly 200A is provided with the transmission antenna AT.

As depicted in FIG. 3A, on the lower surface of the controller 200, various electronic components and various integrated circuits are mounted at high density while being connected together by metallic wiring. While explanation of the wiring is omitted here because of its complexity, mounted components include a central processing unit (CPU) 201, a memory 202 and a transmitter 203. The transmission antenna AT is connected to the transmitter 203. The lower surface of the controller 200 is also provided with a universal serial bus (USB) terminal 204, a battery terminal 205, a connection terminal 206 to the coordinate data formation circuit 100, and so forth.

The CPU 201 controls each of the controller 200. Specifically, the CPU 201 controls the turning on/off of the power and the LEDs in response to user operations on the operation button. The CPU 201 also performs control of receiving the coordinate data from the coordinate data formation circuit 100 and writing the coordinate data to the memory 202, control of reading out the coordinate data written to the memory 202 and transmitting the coordinate data via the transmitter 203, and so forth. The memory 202 mainly stores and holds the coordinate data. Other data may also be recorded in the memory 202 as needed. The transmitter 203 in the present embodiment mainly implements a function of transmitting the coordinate data to the external electronic device by a wireless communication method according to the Bluetooth (registered trademark) standard, for example.

As depicted in FIG. 3B, on the upper surface of the controller 200, the user I/F 200U is provided with the operation button 207 and the LEDs 208 and 209. Incidentally, there are also cases where the upper surface of the controller 200 is provided with metallic wiring to connect with an electronic component or the like on the lower surface via a so-called through hole. The controller 200 configured as above is arranged so that the part, other than the antenna assembly 200A and the user I/F 200U provided as the protruding parts, faces the sensor 1B across the shield sheet 1C. That is, the controller 200 is arranged so that the antenna assembly 200A and the user I/F 200U as the protruding parts can be provided outside the region covered with the shield sheet 1C.

Configuration Example of Coordinate Sensor 1S

FIG. 4 is a diagram for explaining a configuration example of the coordinate sensor 1S of the electromagnetic resonance type installed in the coordinate input device 1 of the present embodiment. The coordinate sensor 1s is formed by connecting the sensor 1B for the coordinate detection having a prescribed area and the coordinate data formation circuit 100 together. The coordinate sensor 1s and the electronic pen 2 constitute an input device of the coordinate input device 1. The coordinate data formation circuit 100 is arranged to face the sensor 1B across the shield sheet 1C. Incidentally, the sensor 1B and the coordinate data formation circuit 100 are connected together via a terminal (connector) that is not illustrated.

FIG. 4 also depicts circuitry of a signal transceiver of the electronic pen (pen-type position indicator) 2 used for the inputting to the electromagnetic resonance type sensor 1B. The electronic pen 2 includes a resonance circuit formed of a coil 2L and a capacitor 2C connected in parallel to the coil 2L. Further, as explained earlier with reference to FIG. 1, the electronic pen 2 also has a ballpoint pen function of being capable of leaving handwriting on a paper medium or the like via the tip 2T projecting from the tip end of the electronic pen 2 with the ink filled into the ferrite lead body 2S wound with the coil 2L.

The coordinate data formation circuit 100 connected to the sensor 1B constitutes a control circuit of the coordinate sensor 1S. The coordinate data formation circuit 100 includes a selection circuit 101, a transmission/reception switch circuit 102, a transmission signal generation circuit 110, a reception signal processing circuit 120, and a process control circuit 130. The transmission signal generation circuit 110 includes an oscillator 111 and a current driver 112. The reception signal processing circuit 120 includes a reception amplifier 121, a wave detection circuit 122, a low pass filter (LPF) 123, a sampling/hold circuit (described as S/H in FIG. 4) 124, and an analog/digital (A/D) conversion circuit 125. The process control circuit 130 is formed of a so-called microprocessor.

The selection circuit 101 is connected to a loop coil set 15X and a loop coil set 15Y of the sensor 1B. The selection circuit 101 successively selects a loop coil for signal transmission/reception from the loop coil sets 15X and 15Y of the sensor 1B according to a selection control signal from the process control circuit 130. The loop coil selected by the selection circuit 101 is connected to a movable terminal M of the transmission/reception switch circuit 102.

The transmission signal generation circuit 110, as a circuit that supplies signals to the loop coils, is formed of the oscillator 111 and the current driver 112. The oscillator 111 generates an alternating current (AC) signal at a frequency f0. This AC signal is supplied to the current driver 112, converted into electric current, and thereafter supplied to the transmission/reception switch circuit 102. The transmission/reception switch circuit 102 switches the destination of connection of the loop coil selected by the selection circuit 101 (a transmission-side terminal T or a reception-side terminal R) at prescribed time intervals according to control by the process control circuit 130. The current driver 112 and the reception amplifier 121 are respectively connected to the transmission-side terminal T and the reception-side terminal R.

Accordingly, when the transmission/reception switch circuit 102 is selecting the transmission-side terminal T (at times of transmission), the AC signal from the current driver 112 is supplied to the loop coil selected by the selection circuit 101. When the transmission/reception switch circuit 102 is selecting the reception-side terminal R (at times of reception), a signal corresponding to induction voltage generated in the loop coil selected by the selection circuit 101 is supplied to the reception signal processing circuit 120.

The reception signal processing circuit 120 is supplied with the signal corresponding to the induction voltage generated in the loop coil selected by the selection circuit 101. This signal is supplied to the reception amplifier 121 via the selection circuit 101 and the reception-side terminal R of the transmission/reception switch circuit 102, amplified by the reception amplifier 121, and sent out to the wave detection circuit 122.

The signal detected by the wave detection circuit 122 is supplied to the A/D conversion circuit 125 via the LPF 123 and the sampling/hold circuit 124. The A/D conversion circuit 125 converts the analog signal detected by the wave detection circuit 122 into a digital signal and supplies the digital signal to the process control circuit 130.

The process control circuit 130 performs control to detect a position indicated by the electronic pen 2 while also performing a process of determining the position on the sensor 1B indicated by the electronic pen 2. Here, the control to detect the position indicated by the electronic pen 2 includes control of the loop coil selection by the selection circuit 101, the signal switching by the transmission/reception switch circuit 102, processing timing of the sampling/hold circuit 124, and so forth.

Next, the operation of the coordinate sensor 1S will be described below. First, the process control circuit 130 controls the transmission/reception switch circuit 102 and thereby switches the selection circuit 101 to be connected to the transmission-side terminal T. Accordingly, the AC signal sent out from the transmission signal generation circuit 110 is supplied to the loop coil selected from the loop coil set 15X or 15Y by the selection circuit 101. The loop coil supplied with the AC signal from the transmission signal generation circuit 110 transmits a signal due to electromagnetic induction. In the description in this application, the signal transmitted from the sensor 1B to the electronic pen 2 as explained above is referred to as a transmission signal. The resonance circuit of the electronic pen 2 receives the signal transmitted from the loop coil, thereby charges the capacitor 2C, makes the coil 2L generate an induction voltage, and transmits a reflective signal.

Subsequently, the process control circuit 130 performs switching control so as to connect the transmission/reception switch circuit 102 to the reception-side terminal R. In this case, an induction voltage occurs in each loop coil in the loop coil sets 15X and 15Y due to the reflective signal transmitted from the electronic pen 2. The reflective signal transmitted from the electronic pen 2 is detected through the reception signal processing circuit 120. The process control circuit 130 calculates coordinate values of the position on the sensor 1B (i.e., on an indication input surface of the sensor 1B) in the X-axis direction and the Y-axis direction based on the level of the voltage value of the induction voltage occurring in each loop coil.

In other words, the process control circuit 130 calculates the coordinate values of the indication position on the sensor 1B in the X-axis direction and the Y-axis direction based on the signal level of the reception signal received by each loop coil recognized as the voltage value. Then, the process control circuit 130 transmits information on the calculated coordinate values (coordinate data) to the controller 200, by which the coordinate data can be written to the memory of the controller 200. In the description in this application, the signal transmitted from the electronic pen 2 and received by the sensor 1B as explained above (reflective signal) is referred to as the reception signal.

As above, the coordinate sensor 1S formed of the sensor 1B and the coordinate data formation circuit 100 determines the indication position on the sensor 1B indicated through the electronic pen 2 by repeating the signal transmission to the electronic pen 2 and the reception of the reflective signal from the electronic pen 2. By such a process performed repeatedly, the handwriting recorded on the notepad 3 (paper medium) with the electronic pen 2 is detected and the coordinate data corresponding to the handwriting are formed and accumulated in the memory.

Details of Arrangement of Controller 200

Figure 5:
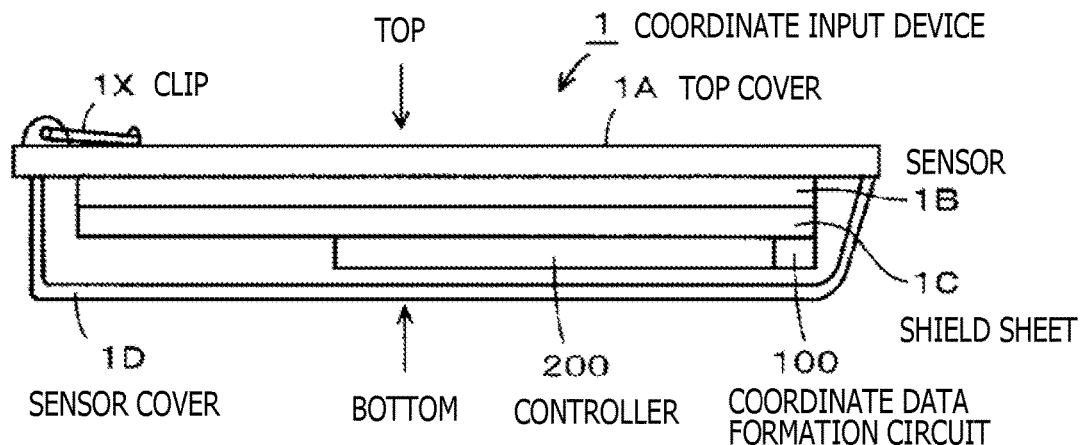
FIG. 5 is a diagram depicting a multilayer structure in the coordinate input device 1 as viewed from a side of the coordinate input device 1 on which the controller 200 is arranged.

FIG. 5 is a cross-sectional view of the coordinate input device 1 as viewed from a side face's side. FIG. 5 depicts a multilayer structure in the coordinate input device 1 as viewed from the side on which the controller 200 is arranged. As depicted in FIG. 5, the coordinate input device 1 has a multilayer structure including the sensor cover 1D as a first layer, the coordinate data formation circuit 100 and the controller 200 as a second layer, the shield sheet 1C as a third layer, the sensor 1B as a fourth layer, and the top cover (top plate) 1A as a fifth layer stacked up from the bottom. Thus, as depicted in FIG. 5 and as explained earlier with reference to FIG. 2, the coordinate data formation circuit 100 and the controller 200 are not situated above the sensor 1B or on the same plane as the sensor 1B. The coordinate data formation circuit 100 and the controller 200 are situated below the shield sheet 1C so as not to directly contact the sensor 1B.

Figure 6:
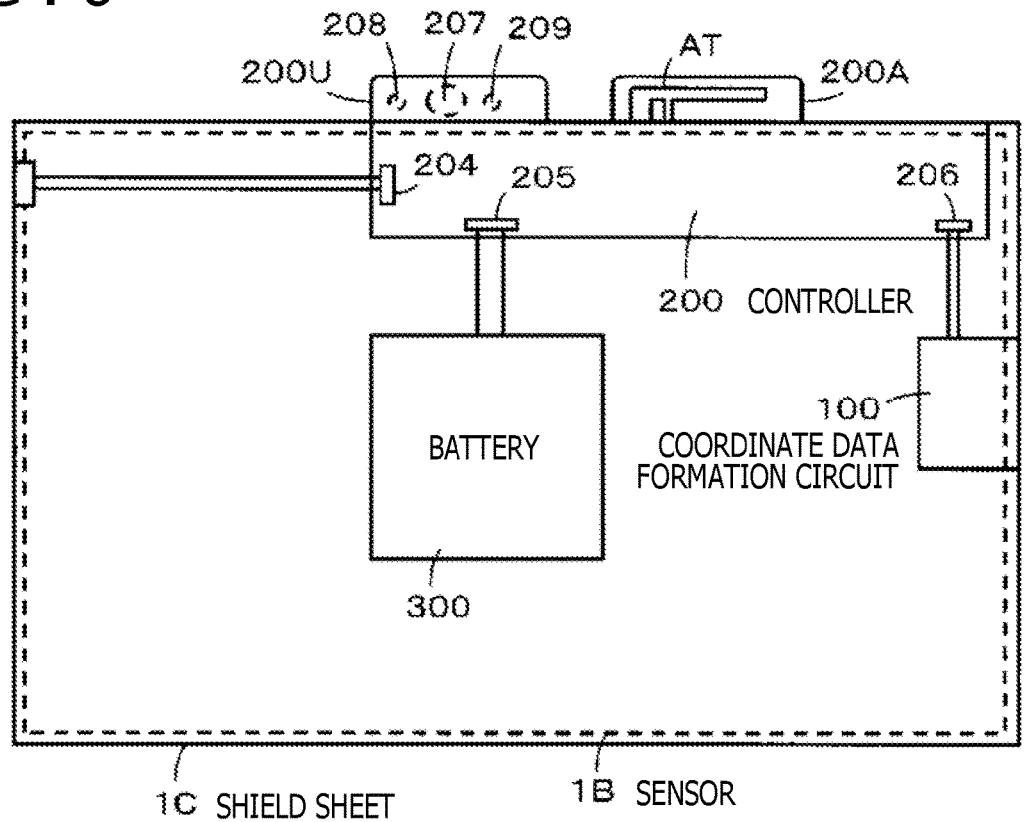
FIG. 6 is a diagram depicting an internal structure of the coordinate input device 1 excluding a sensor cover 1D as viewed from the bottom of the coordinate input device 1.

FIG. 6 is a diagram depicting an internal structure of the coordinate input device 1 excluding the sensor cover 1D as viewed from the bottom. In FIG. 6, the sensor 1B is indicated by dotted lines, and the whole of the lower surface of the sensor 1B is covered with the shield sheet 1C. The shield sheet 1C is of the same size as the lower surface of the sensor 1B or slightly larger than the lower surface. As depicted in FIG. 6, the coordinate data formation circuit 100, the controller 200, and a battery 300 are arranged on the surface of the shield sheet 1C opposite to the surface facing the sensor 1B.

As depicted in FIG. 6, the coordinate data formation circuit 100 is connected to the controller 200 via the connection terminal 206, while the battery 300 is connected to the controller 200 via the battery terminal 205. The electric power from the battery 300 is supplied also to the coordinate data formation circuit 100 via the controller 200.

In the coordinate input device 1 in the present embodiment, the coordinate data formation circuit 100, the controller 200, and the battery 300 are arranged to face the sensor 1B across the shield sheet 1C as depicted in FIG. 6. That is, the coordinate data formation circuit 100, the controller 200, and the battery 300 can be arranged in the vicinity of the sensor 1B by placing the shield sheet 1C in between.

However, not the whole of the controller 200 faces the sensor 1B across the shield sheet 1C. As explained earlier with reference to FIGS. 3A and 3B, the controller 200 is provided with the two protruding parts: the antenna assembly 200A and the user I/F 200U. The controller 200 is arranged so that the antenna assembly 200A and the user I/F 200U are situated outside the region covered with the shield sheet 1C as depicted in FIG. 6.

In other words, part of the controller 200 as a signal source, excluding the antenna assembly 200A and the user I/F 200U operated by the user, is provided in the vicinity of the sensor 1B so as to face the sensor 1B across the shield sheet 1C. Therefore, even if a signal is generated in the part of the controller 200 facing the sensor 1B and emitted, leakage of the emitted signal into the sensor 1B is prevented thanks to the existence of the shield sheet 1C. Further, the magnetic fluxes generated by the sensor 1B are also absorbed by the shield sheet 1C and prevented from affecting the coordinate data formation circuit 100 or the controller 200.

In contrast, the antenna assembly 200A and the user I/F 200U of the controller 200 are situated outside the region covered with the shield sheet 1C as depicted in FIG. 6. Thus, the antenna assembly 200A and the user I/F 200U are not covered with the shield sheet 1C, nor do they face the sensor 1B. While the antenna assembly 200A is provided with the transmission antenna AT formed of a planar conductor, the transmission antenna AT can be arranged at a position slightly apart from the sensor 1B.

Further, in the present embodiment, the transmission antenna AT of the antenna assembly 200A has directivity characteristics to emit radio waves in directions of separating from the sensor 1B, and thus the radio waves emitted from the transmission antenna AT do not leak into the sensor 1B. Furthermore, signals emitted from the transmission antenna AT are prevented from interfering with the signals communicated between the sensor 1B and the electronic pen 2.

Operations on Coordinate Input Device 1 and Coordinate Data Transmission Process The power of the coordinate input device 1 in the present embodiment configured as above is turned on and off by depressing the operation button 207 provided on the user OF 200U. Specifically, to turn on the power of the coordinate input device 1 when the power is off, the operation button 207 is depressed once. In response, the CPU 201 of the controller 200 functions and the electric power from the battery 300 is supplied to each to turn each into the operating state. When the power is turned on, the CPU 201 of the controller 200 lights up the LED 209, for example. This allows the user to recognize that the coordinate input device 1 is in a power on state.

To turn off the power of the coordinate input device 1 that has been on, a so-called hold down operation is performed on the operation button 207. Specifically, a depressing operation on the operation button 207 is continued for approximately three seconds. The CPU 201 detecting the hold down operation on the operation button 207 controls each part to end the processing, stops supplying the electric power to each part, and turns off the power of the coordinate input device 1. In this case, the LED 209 is also turned off, allowing the user to recognize that the coordinate input device 1 has been turned off. As above, the turning on and off of the power of the coordinate input device 1 can be carried out by the operations on the operation button 207.

It is assumed here that the user has turned on the power of the coordinate input device 1 and thereafter left handwriting on the notepad 3 fixed on the coordinate input device 1 by writing characters, figures, etc. with the electronic pen 2, for example. In this case, coordinate data corresponding to the handwriting are formed by the functions of the sensor 1B and the coordinate data formation circuit 100 based on reception positions of the aforementioned reflective signal from the electronic pen 2 on the sensor 1B. The coordinate data formed as above are supplied to the controller 200 and accumulated in the memory 202.

It is of course possible to transmit the coordinate data formed by the functions of the sensor 1B and the coordinate data formation circuit 100 to the external electronic device in real time. In this case, the coordinate data can be transmitted to the external electronic device either not via the memory 202 or after recording the coordinate data in the memory 202 once. In cases where the coordinate data are transmitted to the external electronic device in real time as above, the coordinate data immediately becomes available also in the external electronic device.

However, there are cases where the usability is improved by making it possible to transmit a cluster of coordinate data to the external electronic device with timing intended by the user, such as at the end of describing information on one page of the notepad 3, instead of constantly transmitting the coordinate data. Further, transmitting a cluster of coordinate data reduces power consumption in comparison with constantly performing the transmission process.

Thus, in the coordinate input device 1 of the present embodiment, the coordinate data accumulated in the memory 202 can be transmitted to the external electronic device all at once by depressing the operation button 207 once when the power is on. In this case, the CPU 201 lights up the LED 208 during the transmission of the coordinate data to the external electronic device, and extinguishes the LED 208 when the transmission of the coordinate data is over. This makes it possible to notify the user whether or not the coordinate input device 1 is in the middle of transmitting the coordinate data.

Incidentally, coordinate data transmitted normally may be deleted from the memory 202, by which repeated transmission of the same coordinate data can be avoided. Employing a method of storing coordinate data in the memory once makes it possible to retransmit the coordinate data when an error occurred in the transmission, for example.

Coordinate data transmitted appropriately may also be accumulated in the memory 202 as a cluster of already-transmitted coordinate data to be discriminable from coordinate data not transmitted yet. As a simple method, it is effective to separate files for accumulating untransmitted coordinate data and files for accumulating already-transmitted coordinate data from each other. With such a configuration, coordinate data formed once can be transmitted to the external electronic device and made available any time in response to the user's request.

It is also possible to perform control so as not to carry out the coordinate data transmission process in response to the depressing operation on the operation button 207 of the coordinate input device 1 in the power on state if no accumulated data exists in the memory 202.

Incidentally, while the transmitter 203 of the controller 200 has been described to perform wireless communication according to the Bluetooth (registered trademark) standard in the above embodiment, the standard for the wireless communication is not limited to this example. Various wireless communication standards such as short-range wireless communication standards called Wi-Fi (registered trademark), near field radio communication (NFC), etc. can be employed, for example. In short, various communication methods using radio waves having a lower frequency (longer wavelength) than infrared rays can be employed.

The coordinate input to the coordinate input device 1 of the present embodiment is made necessarily by use of the electronic pen 2. Therefore, it is desirable to provide an attachment part for the electronic pen 2 at an appropriate position on the coordinate input device 1 so as to prevent the electronic pen 2 from separating from the coordinate input device 1 when not used. The attachment part can be configured in various ways, such as providing a holder or a pocket that stores the electronic pen 2, providing a hook that engages with a clip formed on a cap of the electronic pen 2, or providing a ring member that holds the electronic pen 2.

While the coordinate sensor 1S of the electromagnetic resonance type is used in the present embodiment, the type of the coordinate sensor is not limited to this example. It is also possible to use a coordinate sensor of the electromagnetic induction type having only a function of receiving a signal for position indication from the electronic pen 2 without transmitting a signal to the electronic pen. In this case, the electronic pen 2 includes a battery and is capable of spontaneously transmitting the signal for position indication to the sensor.

The coordinate sensor corresponding to the electronic pen capable of spontaneously transmitting the signal for position indication to the sensor has a configuration obtained by removing the transmission/reception switch circuit 102 and the transmission signal generation circuit 110 including the oscillator 111 and the current driver 112 from the electromagnetic resonance type coordinate sensor depicted in FIG. 4. That is, the coordinate sensor is configured so that the reception signal from the selection circuit 101 is directly supplied to the reception signal processing circuit 120.

Second Embodiment

External Appearance and Basic Configuration of Cover Type Coordinate Input Devices 5 and 5A

Figure 7:
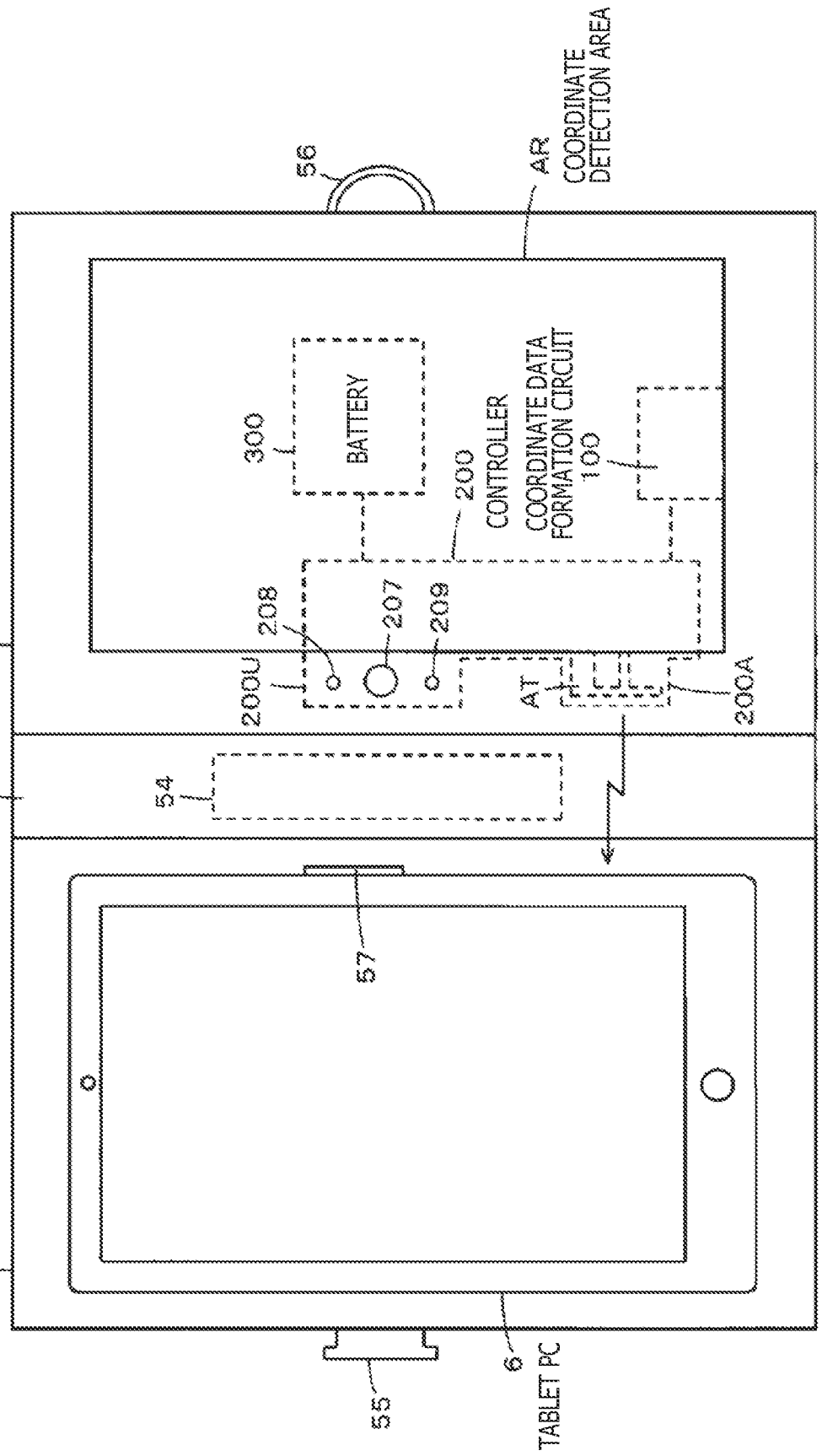
FIG. 7 is a diagram for explaining a configuration example of a cover type coordinate input device 5 according to a second embodiment of the present disclosure.
Figure 8:
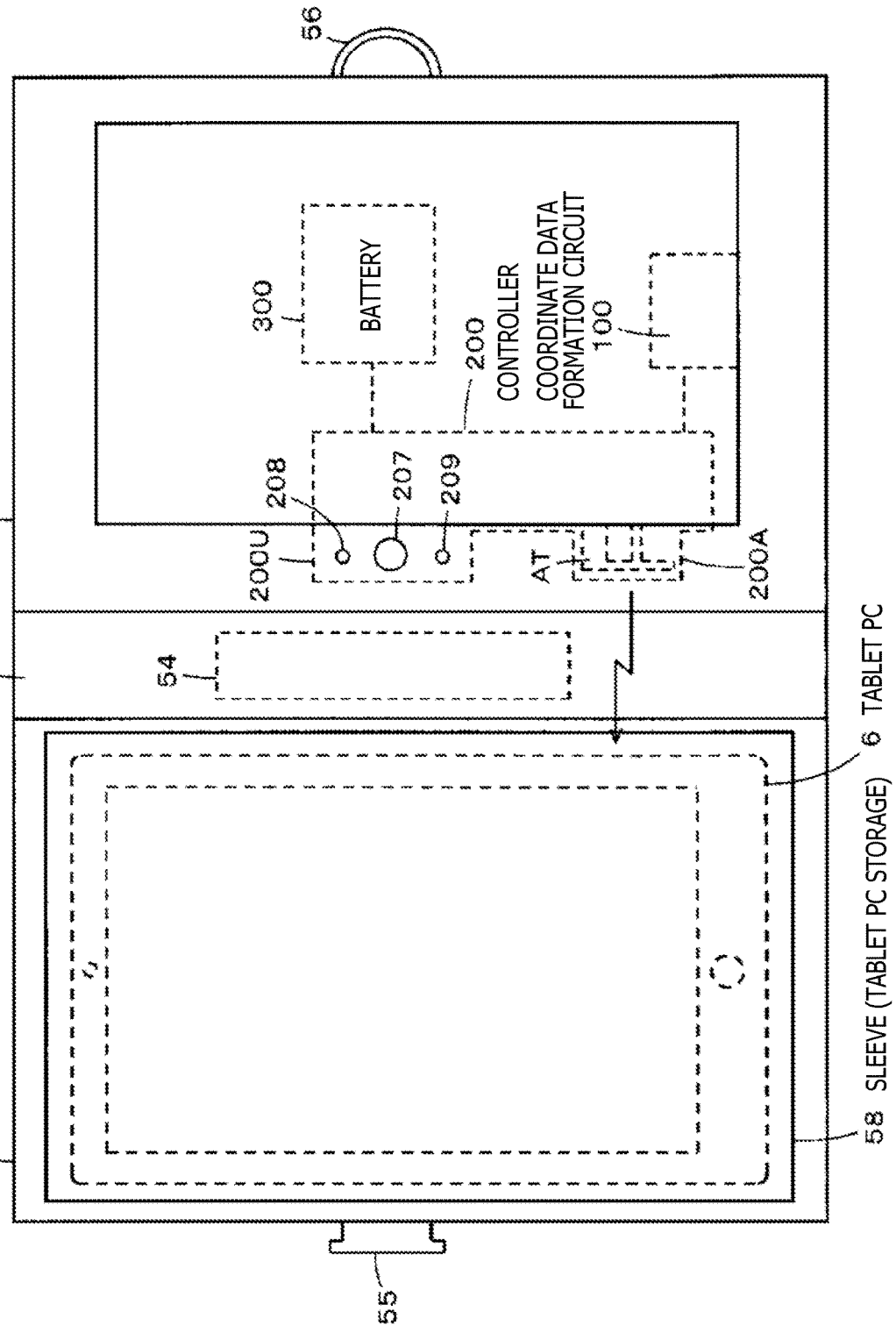
FIG. 8 is a diagram for explaining a configuration example of a cover type coordinate input device 5A according to the second embodiment of the present disclosure.

FIGS. 7 and 8 are diagrams for explaining concrete examples of a combined use type coordinate input device according to a second embodiment to be used in combination with a tablet PC. Specifically, FIG. 7 is a diagram for explaining a configuration example of a cover type coordinate input device 5 as a combined use type coordinate input device, while FIG. 8 is a diagram for explaining a configuration example of another cover type coordinate input device 5A as a combined use type coordinate input device. In the following description, each cover type coordinate input device will be referred to simply as a coordinate input device.

Configuration Example of Coordinate Input Device 5

First, the coordinate input device 5 will be explained below. As depicted in FIG. 7, the coordinate input device 5 is a device of the so-called book type which can be folded in half, mainly including a coordinate sensor assembly (back cover) 51 in which the coordinate sensor is arranged, a tablet PC mount (front cover) 52 on which a tablet PC is mounted, and a spine 53.

The coordinate sensor assembly (back cover) 51 is configured similarly to the coordinate input device 1 in the first embodiment which has been described with reference to FIGS. 1 to 6. That is, as explained earlier by mainly referring to FIGS. 2 and 5, the coordinate sensor assembly 51 is configured by stacking the top cover (top plate) 1A, the sensor 1B, the shield sheet 1C, and the sensor cover 1D. In FIG. 7, a coordinate detection area AR indicated by solid lines corresponds to an area (region) in which the coordinate detection by the sensor 1B is possible.

Incidentally, while the coordinate input device 5 in the second embodiment is not provided with the clip 1x for the notepad 3, a part including the coordinate detection area is provided with a slit into which the spine of the notepad can be inserted, for example. By inserting the spine of the notepad 3 into the slit, the notepad 3 can be fixed on the coordinate sensor assembly 51.

Also in the coordinate sensor assembly 51 in the present embodiment, the coordinate data formation circuit 100, the controller 200, and the battery 300 are provided to face the sensor 1B across the shield sheet 1C as depicted in FIG. 7. That is, the coordinate data formation circuit 100, the controller 200, and the battery 300 can be provided in the vicinity of the sensor 1B by placing the shield sheet in between. Further, the controller 200 is provided with the antenna assembly 200A and the user I/F 200U as the protruding parts as explained earlier with reference to FIGS. 3A and 3B.

Thus, also in the coordinate sensor assembly 51, the controller 200 is arranged so that its antenna assembly 200A and user I/F 200U are situated outside the region covered with the shield sheet 1C as indicated by dotted lines in FIG. 7. In the coordinate sensor assembly 51 in the present embodiment, the antenna assembly 200A and the user I/F 200U are arranged to be situated on the tablet PC mount 52's side.

The tablet PC mount 52 in the present embodiment is a part on which a tablet PC having a communication function according to the Bluetooth (registered trademark) standard is mounted. The tablet PC mount 52 is provided with a holder 57 that holds the mounted tablet PC on the tablet PC mount 52. The tablet PC is held by the holder 57 to be attachable and detachable to/from the tablet PC mount 52. The tablet PC mount 52 can be formed by using various materials such as synthetic resin or aluminum, or by using various materials in combination, for example.

The spine 53 links (connects) the coordinate sensor assembly 51 and the tablet PC mount 52 together and serves as a center part, or a central part when the coordinate input device 5 is folded in half. In short, the spine 53 has a function of a so-called hinge. The spine 53 can also be formed by using various materials such as synthetic resin or aluminum, or by using various materials in combination. The spine 53 is provided with an electronic pen attachment part 54 as indicated by dotted lines. The electronic pen can be attached and detached to/from the electronic pen attachment 54.

In this example, an upper end of the electronic pen attachment part 54 is provided with a clip insertion part that enables the user to attach the electronic pen 2 to the electronic pen attachment part 54 by inserting a clip formed on a cap of the electronic pen 2 into the clip insertion part. The function of holding the electronic pen 2 can be implemented in various modes, such as providing a holder or pocket that stores the electronic pen 2 or providing a ring that holds the electronic pen 2.

As depicted in FIG. 7, the transmission antenna AT of the controller 200 is situated on the tablet PC's side, that is, in the vicinity of the spine 53. Further, as depicted in FIG. 7, the coordinate sensor assembly 51 and the tablet PC mount 52 are linked together by the spine 53 and their positional relationship is maintained to be close to each other. This makes it possible to maintain a desirable state with no obstacle or the like existing between the controller 200 and the tablet PC's controller. With this configuration, wireless communication can be performed excellently between the controller 200 of the coordinate sensor assembly 51 and the controller of the tablet PC.

Specifically, the coordinate data detected by the sensor 1B arranged (installed) in the coordinate sensor assembly 51 can be transmitted via the controller 200 to the tablet PC mounted on the tablet PC mount 52 reliably and excellently. The tablet PC mounted on the tablet PC mount 52 can receive the coordinate data transmitted from the controller 200 of the coordinate sensor assembly 51 reliably and excellently and use the received coordinate data. Further, the configuration enabling the coordinate data formation circuit 100, the controller 200, and the battery 300 to be arranged in the vicinity of the sensor 1B by placing the shield sheet 1C in between is similar to that in the first embodiment described above.

Furthermore, as mentioned earlier, the coordinate input device 5 in the present embodiment can be folded in half around the spine 53 to make the coordinate sensor assembly 51 and the tablet PC mount 52 face each other. Moreover, as depicted in FIG. 7, a left lateral part of the tablet PC mount 52 is provided with a hook 55, while a right lateral part of the coordinate sensor assembly 51 is provided with a band 56. Thus, when the coordinate input device 5 has been folded around the spine 53 to make the coordinate sensor assembly 51 and the tablet PC mount 52 face each other, the folded state can be maintained by engaging the band 56 with the hook 55.

With this configuration, the size of the coordinate input device 5 in the folded state can be as small as approximately the half of the size in the opened state. The display screen of a tablet PC 6 mounted on the tablet PC mount 52 is brought into a state of facing the upper surface of the coordinate sensor assembly 51 without being exposed to the outside. Since this state can be maintained by the function of the hook 55 and the band 56, it becomes easy to carry the coordinate input device 5 while protecting the display screen of the tablet PC 6.

Configuration Example of Coordinate Input Device 5A

Next, the coordinate input device 5A will be explained below. As depicted in FIG. 8, the coordinate input device 5A basically has similar configuration to the coordinate input device 5 depicted in FIG. 7. Thus, in the coordinate input device 5A depicted in FIG. 8, parts configured in similar way to the coordinate input device 5 depicted in FIG. 7 are assigned the same reference symbols as in FIG. 7 and repeated explanation thereof is omitted for brevity. In the coordinate input device 5A depicted in FIG. 8, the configuration of a tablet PC mount (front cover) 52A on which the tablet PC is mounted differs from that of the tablet PC mount 52 of the coordinate input device 5 depicted in FIG. 7.

The tablet PC mount 52A of the coordinate input device 5A is provided with a sleeve (tablet PC storage) 58 instead of the holder 57 provided on the tablet PC mount 52 depicted in FIG. 7. The tablet PC 6 can be stored in the sleeve 58. Thus, when the tablet PC 6 is not used, the tablet PC 6 can be stored in the sleeve 58 as depicted in FIG. 8 and the coordinate input device 5A can be folded in half and carried in similar way to the coordinate input device 5 explained above with reference to FIG. 7.

When the tablet PC 6 is used, the tablet PC 6 is extracted from the sleeve 58 and mounted on the sleeve 58 of the tablet PC mount 52A to be usable. In this example, however, the tablet PC is not fixed to the tablet PC mount 52A, and thus the user can operate the tablet PC 6 while holding the tablet PC alone as needed.

As above, in the case of the coordinate input device 5A depicted in FIG. 8, by utilizing the sleeve 58, the tablet PC used in combination with the coordinate input device 5A can be held easily and safely and carried together with the coordinate input device 5A. Further, since the tablet PC can be extracted from the sleeve 58 with ease and used without being fixed to the tablet PC mount 52A, it is also easy to pick up the tablet PC only and use the tablet PC alone.

Incidentally, while the coordinate input device 5 depicted in FIG. 7 in which the tablet PC mount 52 is provided with the holder 57 for the tablet PC and the coordinate input device 5A depicted in FIG. 8 in which the tablet PC mount 52A is provided with the sleeve for storing the tablet PC have been explained here, the configuration of the tablet PC mount is not limited to these examples. For example, the coordinate input device may also be configured in a style with no holder 57 or sleeve 58 provided on the front cover serving as the tablet PC mount. In this case, such a configuration is equivalent to a device obtained by providing the coordinate input device 1 depicted in FIG. 1 with a cover for protecting the upper surface's side of the coordinate input device 1.

Further, while the transmission antenna AT has been assumed to be arranged on the tablet PC mount 52 or 52A's side of the coordinate sensor assembly 51 as explained with reference to FIGS. 7 and 8, the configuration regarding the transmission antenna AT is not limited to this example. For example, the entire controller 200 or the antenna assembly 200A as the protruding part may be configured in the form of a flexible substrate to be freely foldable and to protrude from part of the controller 200.

With such a configuration, it is also possible to arrange the transmission antenna AT in the spine 53 or on the tablet PC mount 52 or 52A's side. In such cases, the transmission antenna AT can be placed farther from the sensor 1B and closer to the tablet PC.

Another Embodiment

A coordinate input device 7 according to another embodiment described below is a coordinate input device configured so that a binder (clipboard) as general-purpose stationery can be attached and detached to/from the coordinate input device. With this configuration, when the binder as general-purpose stationery is attached to the coordinate input device 7 of the present embodiment, the coordinate input device 7 implements functions similarly to the coordinate input device 1 of the first embodiment having the function of the binder and the function of the coordinate sensor in one body. When the binder as general-purpose stationery is not attached to the coordinate input device 7 of the present embodiment, the coordinate input device 7 implements the function of an input device called a tablet, digitizer, etc. for inputting coordinate data to an information processing device such as a personal computer.

In the coordinate input device 7 of the present embodiment described below, parts configured in similar way to the coordinate input device 1 of the first embodiment described earlier are assigned the same reference symbols as in the first embodiment and repeated explanation thereof is omitted for brevity.

Figure 9:
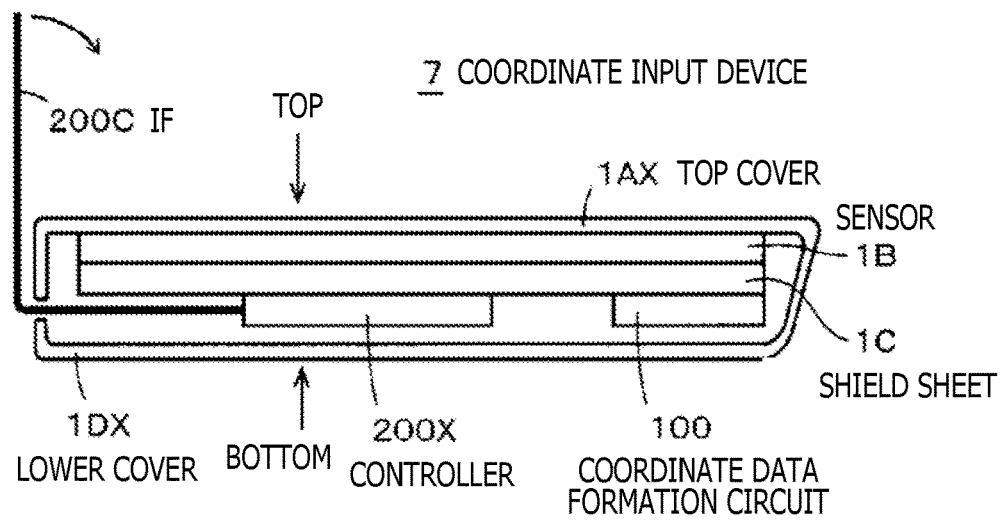
FIG. 9 is a diagram depicting a multilayer structure in a coordinate input device 7 as viewed from a side of the coordinate input device 7 on which a controller 200X is arranged.

FIG. 9 is a diagram depicting multilayer structure in the coordinate input device 7 of the present embodiment as viewed from a side on which a controller 200X is arranged. As depicted in FIG. 9, the coordinate input device 7 of the present embodiment is formed by storing the sensor 1B, the shield sheet 1C, the coordinate data formation circuit 100, and the controller 200X in a housing made up of an upper cover 1AX and a lower cover 1DX. The arrangement of these components is substantially similar to that in the coordinate input device 1 of the first embodiment explained with reference to FIGS. 2 and 5.

Specifically, the sensor 1B of the electromagnetic resonance type having a prescribed area is provided under the upper cover 1AX. Under the sensor 1B, the shield sheet 1C is provided so as to cover the whole of the surface of the sensor 1B opposite to the surface facing the electronic pen.

The controller 200X and the coordinate data formation circuit 100 are provided across the shield sheet 1C from the sensor 1B.

The controller 200X in the present embodiment differs from the controller 200 in the first embodiment depicted in FIGS. 3 and 7 in the shape although the mounted electronic components, etc. are the same. The controller 200X in the present embodiment is configured so that an IF 200C, including a user I/F (operation unit) provided with the operation button 207 and the LEDs 208 and 209 and a transmission antenna assembly provided with the transmission antenna AT, projects to the outside of the coordinate input device 7.

In the coordinate input device 7 of the present embodiment, the IF 200C of the controller 200X is configured as a flexible substrate that can be folded. Accordingly, the operation button 207, the LEDs 208 and 209, and the transmission antenna AT can be placed on the upper cover 1AX of the coordinate input device 7 by folding the IF 200C to the upper cover 1AX's side. This configuration allows the user to operate the operation button 207 and view the status display by the LEDs 208 and 209 with ease, while also enabling excellent radio wave transmission from the transmission antenna AT.

Figure 10:
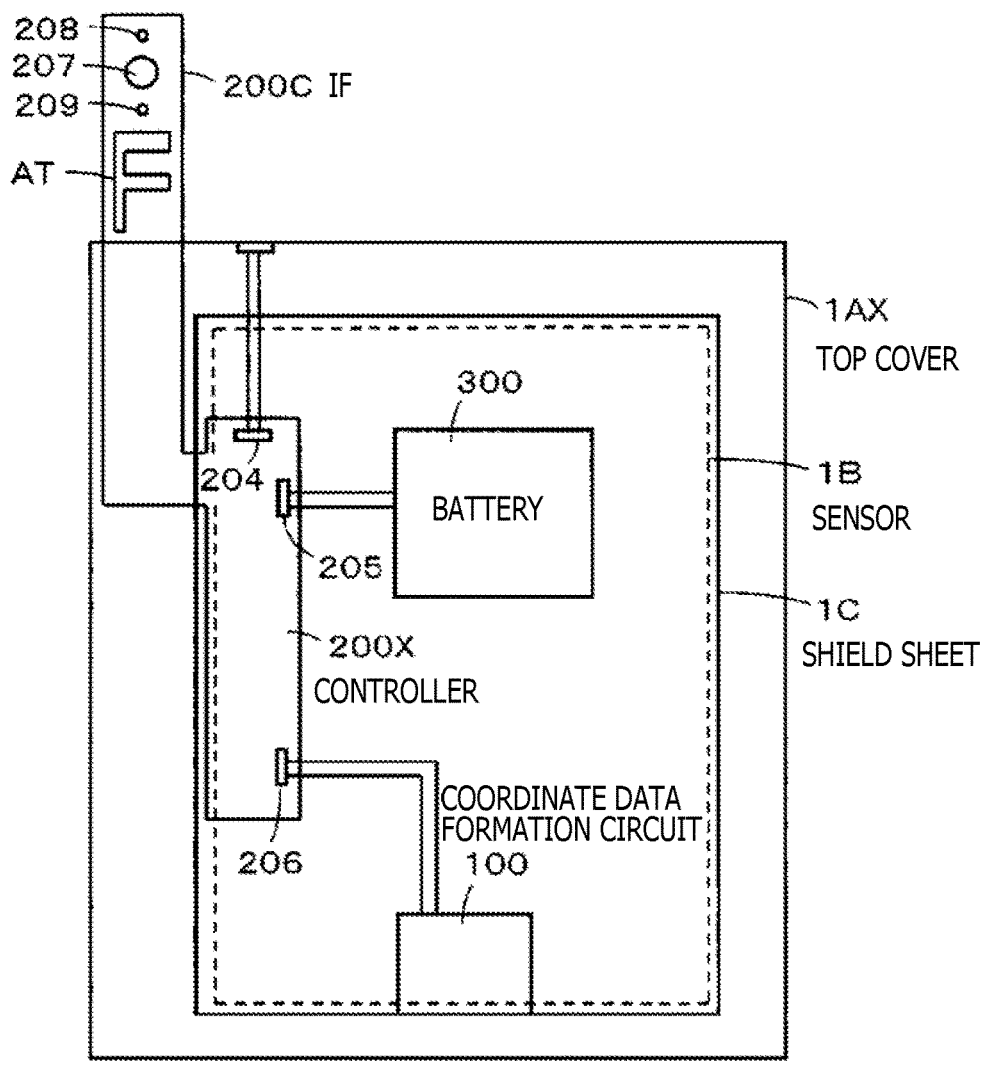
FIG. 10 is a diagram depicting an internal structure of the coordinate input device 7 excluding a lower cover 1DX as viewed from the bottom of the coordinate input device 7.

FIG. 10 is a diagram depicting internal structure of the coordinate input device 7 excluding the lower cover 1DX as viewed from the bottom. The arrangement relationship, etc. of the shield sheet 1C and the sensor 1B indicated by dotted lines are similar to those in the first embodiment explained with reference to FIG. 6. The configuration in which the coordinate data formation circuit 100, the main of the controller 200X, and the battery 300 are arranged across the shield sheet 1C from the sensor 1B is also similar to that in the first embodiment explained with reference to FIG. 6. Here, a main part of the controller 200X includes a part on which the CPU 201, the memory 202, the transmitter 203, etc. are mounted. Thus, by placing the shield sheet 1C in between, the coordinate data formation circuit 100, the main of the controller 200X, and the battery 300 can be arranged in the vicinity of the sensor 1B.

As depicted in FIG. 10, in the coordinate input device 7 of the present embodiment, the strip-shaped IF 200C provided with the transmission antenna AT, the operation button 207, and the LEDs 208 and 209 is configured to be connected to the main part of the controller 200X. Further, the strip-shaped IF 200C provided with the transmission antenna AT, the operation button 207, and the LEDs 208 and 209 has a shape projecting from the coordinate input device 7's housing made up of the upper cover 1AX and the lower cover 1DX as depicted also in FIG. 9.

As above, an important difference is that the user OF 200U and the antenna assembly 200A of the controller 200, which were situated inside the housing of the coordinate input device 1 in the first embodiment, are provided to project to the outside of the housing. Incidentally, while the operation button 207 is configured to be operable by the user and the LEDs 208 and 209 are configured to be monitorable by the user, the transmission antenna AT is configured so as not to be directly touched by the user. Specifically, the IF 200C of the controller 200X in the present embodiment is covered with resin or the like, for example, so that the user cannot directly touch the wiring, transmission antenna, etc. Of course, the operation button 207 is configured to be operable by the user and the LEDs 208 and 209 are configured to be viewable by the user.

FIGS. 11A, 11B, and 11C depict diagrams for explaining a concrete mode of usage of the coordinate input device 7.

FIG. 11A is an external view of the coordinate input device 7 and FIG. 11B is an external view of a binder 8 as general-purpose stationery mounted on the coordinate input device 7 and used. As depicted in FIG. 11B, the binder 8 is configured so that a notepad 3 can be fixed thereon with a clip 1x and used. FIG. 11C is an external view depicting a state in which the binder 8 has been mounted on the coordinate input device 7 to be usable.

Specifically, in the present embodiment, the binder 8 serves as the top plate for the coordinate input device 7, and the coordinate input device is attachable and detachable to/from the lower side of the binder 8. Put another way, the binder 8 functioning as the top plate of the coordinate input device 7 is attachable and detachable to/from the coordinate input device 7.

As depicted in FIG. 11A, the four corners of the coordinate input device 7 in the present embodiment are provided with bands 7a, 7b, 7c, and 7d having elasticity for holding the binder 8 mounted on the coordinate input device 7 securely on the coordinate input device 7. The bands 7a, 7b, 7c, and 7d are formed of rubber or resin. Among these four bands, the band 7d in the upper left part functions also to hold the IF 200C, configured to be foldable and connected to the main part of the controller 200X, on the upper cover 1AX of the coordinate input device 7.

Therefore, when the coordinate input device 7 is in the state depicted in FIG. 11A, if the binder 8 is mounted on the coordinate input device 7 and held with the bands 7a, 7b, 7c, and 7d, the IF 200C sandwiched between the coordinate input device 7 and the binder 8 is not exposed. Accordingly, erroneous operations on the operation button 207 can be prevented when the coordinate input device 7 is carried or not used, for example.

As depicted in FIG. 11C, when the binder 8 is mounted on the coordinate input device 7 and used, the IF 200C configured to be foldable is held on the binder 8 by using the band 7d. This allows the IF 200C including the operation button 207 and the LEDs 208 and 209 to be held on the binder 8 in the exposed state. Accordingly, the operation button 207 of the IF 200C becomes operable by the user, the LEDs 208 and 209 of the IF 200C become viewable by the user, and the user is enabled to grasp the operating status of the coordinate input device 7 based on the display status of the LEDs.

Further, the IF 200C is provided with the transmission antenna AT. In this case, the transmission antenna AT is situated in the upper left end part as depicted in FIG. 11C. This allows the transmission antenna AT to be situated outside the coordinate input device 7, by which the coordinate data transmission can be carried out excellently.

Figure 11:
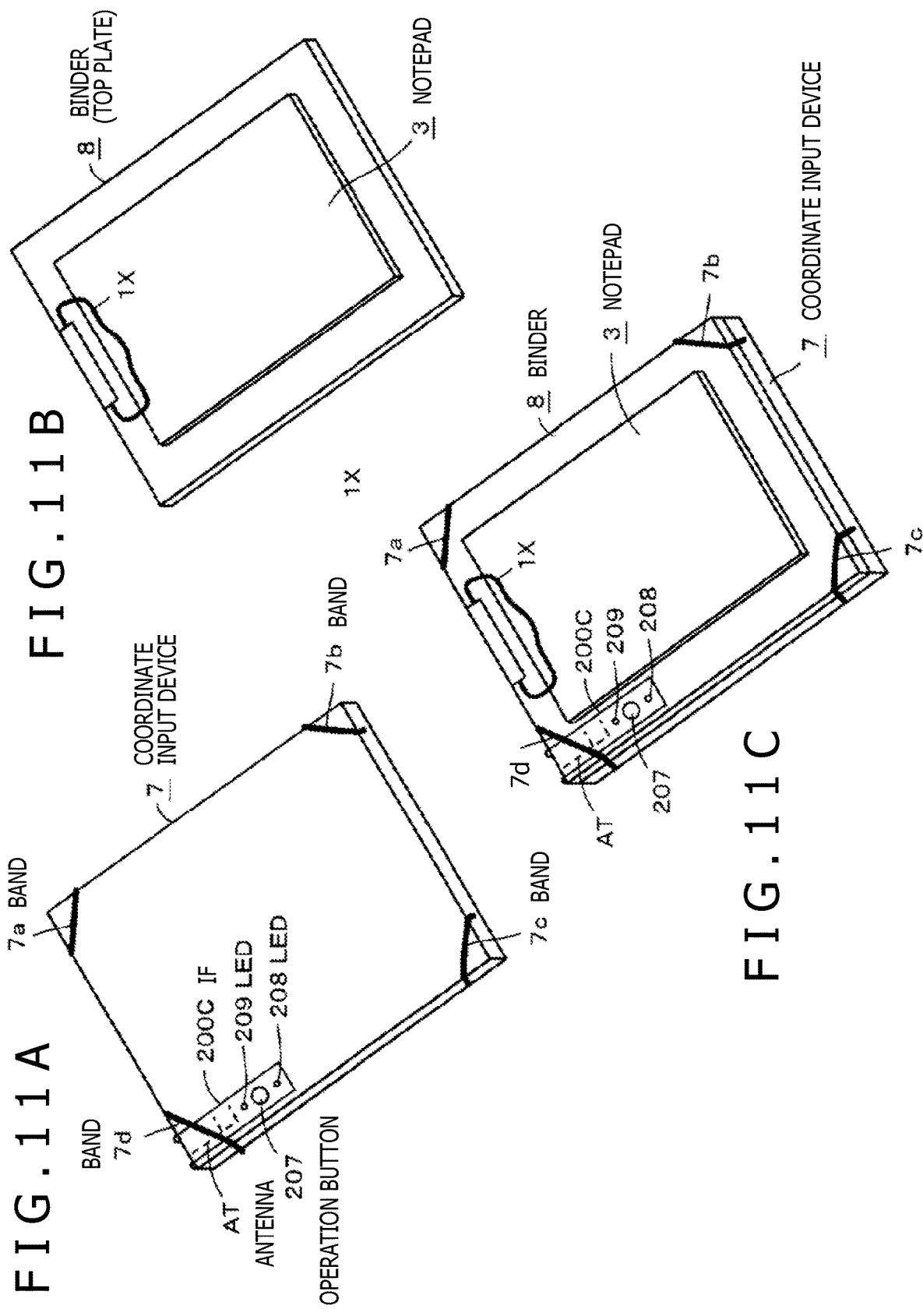
[FIGS. 11A, 11B, and 11C]

Incidentally, while the operation button 207, the LEDs 208 and 209, and the transmission antenna AT are arranged in the IF 200C provided to project from the coordinate input device 7 in the present embodiment explained with reference to FIGS. 9 to 11, the arrangement of the operation button 207, the LEDs 208 and 209, and the transmission antenna AT is not limited to this example. At least the operation button 207 and the LEDs 208 and 209 are arranged in the IF 200C provided to project from the coordinate input device 7. However, it is of course possible to arrange the transmission antenna AT in a protruding part that protrudes from the main part of the controller 200X to have the transmission antenna AT itself situated inside the housing of the coordinate input device 7 similarly to the first and second embodiments described earlier.

Further, while the controller 200X has been assumed to be configured as a flexible substrate in the coordinate input device 7 of the present embodiment, the configuration of the controller 200X is not limited to this example. It is also possible to configure the main part of the controller 200X as an ordinary circuit board and form only the IF 200C with a foldable material.

Furthermore, while the above embodiment is configured so that a notepad (handwriting record medium) 3 can be fixed to the binder (top plate) 8 and the binder 8 can be attached and detached to/from the coordinate input device 7, the usage of the coordinate input device 7 is not limited to this example. Of course, the coordinate input device 7 may also be used with a notepad directly attached thereto. In short, it is sufficient if a handwriting record medium such as a notepad is attachable and detachable to/from the coordinate input device 7. In such cases where a notepad is directly attached to the coordinate input device 7, the upper cover 1AX of the coordinate input device implements the function of the top plate of the coordinate input device 1 for holding the handwriting record medium.

Another Example of Coordinate Sensor

While the coordinate input devices in the above embodiments have been described to employ a coordinate sensor of the electromagnetic resonance type (EMR type) or the electromagnetic induction type as the coordinate sensor 1S, the coordinate sensor 1s is not limited to these types; a coordinate sensor of the capacitive type can also be employed. In the following, a configuration example of a coordinate sensor of the capacitive type and a configuration example of an electronic pen used with the capacitive type coordinate sensor (capacitive type electronic pen (active electronic pen)) will be described.

Figure 12:
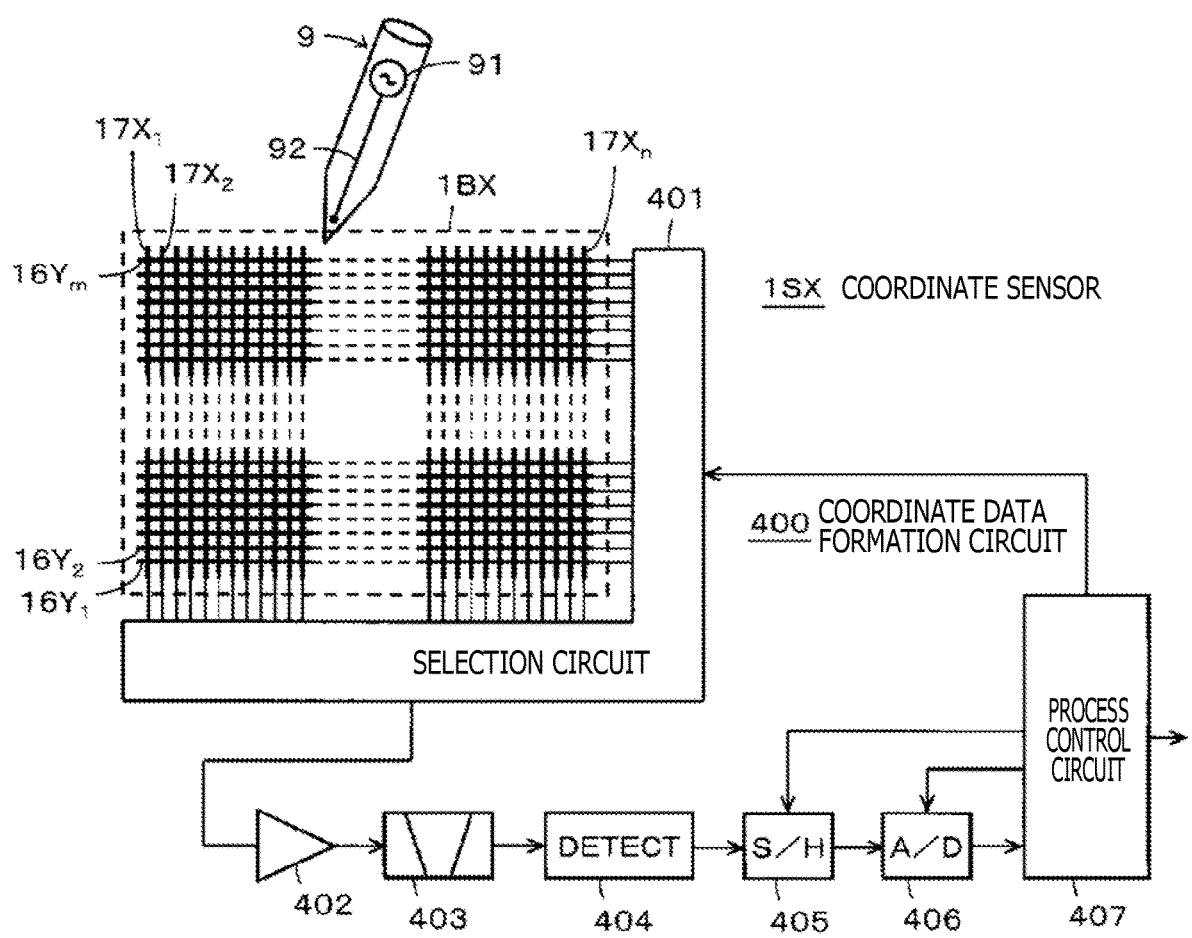
FIG. 12 is a block diagram for explaining a configuration example of a coordinate sensor 1SX of a capacitive type.

FIG. 12 is a block diagram for explaining the basic configuration of a capacitive type electronic pen (hereinafter referred to simply as an electronic pen) 9 and a configuration example of a capacitive type coordinate sensor 1SX receiving a signal from the electronic pen 9 and detecting the indication position on a sensor 1BX.

First, the basic configuration of the electronic pen 9 will be explained. As depicted in FIG. 9, the electronic pen 9 includes a transmission circuit 91 and a lead body 92. The transmission circuit 91 is formed of an inductance-capacitance (LC) oscillation circuit employing the oscillation of a coil and a capacitor, for example, and generates a signal at a prescribed frequency. The lead body 92 is configured as an electrode lead made of hard resin into which a conductor such as conductive metal or conductive powder has been mixed. The lead body 92 will be referred to as an electrode lead 92 in the following explanation.

The electrode lead 92 in this example is also hollow and filled with ink. A metallic tip implementing the ballpoint pen function is provided at the tip end of the electrode lead 92. Leaving handwriting on a paper medium with ink is also possible by moving the tip in contact with the paper medium. Further, the transmission circuit 91 and the electrode lead 92 are connected together by a connection line made of a conductor so that a transmission signal from the transmission circuit 91 is supplied through the electrode lead 92 to the tip at the tip end of the electrode lead 92 and transmitted from the tip.

Next, the configuration of the capacitive type coordinate sensor 1SX will be described. As depicted in FIG. 9, the coordinate sensor 1SX is formed of a sensor 1BX and a coordinate data formation circuit 400 connected to the sensor 1BX. While a cross-sectional view is omitted here, the sensor 1BX in this example is formed by stacking a first conductor set 16, an insulation layer (not depicted), and a second conductor set 17 in this order from the bottom. The first conductor set 16 is formed by parallelly arranging a plurality of first conductors 16Y1, 16Y2, . . . , and 16Ym (m: integer larger than or equal to 1) extending in a transverse direction (X-axis direction) at prescribed intervals in the Y-axis direction, for example.

The second conductor set 17 is formed by parallelly arranging a plurality of second conductors 17X1, 17X2, . . . , and 17Xn (n: integer larger than or equal to 1) extending in a direction crossing the extending direction of the first conductors 16Y1, 16Y2, . . . , and 16Ym, specifically, extending in a longitudinal direction (Y-axis direction) orthogonal to the extending direction in this example, at prescribed intervals in the X-axis direction.

As above, the sensor 1BX of the coordinate sensor 1SX has a configuration for detecting the position indicated by the capacitive type electronic pen 9 by using a sensor pattern formed by arranging the first conductor set 16 and the second conductor set 17 to cross each other. In the following description, when it is unnecessary to discriminate each conductor from other conductors in regard to the first conductors 16Y1, 16Y2, . . . , and 16Ym, the conductor will be referred to as a first conductor 16Y. Similarly, when it is unnecessary to discriminate each conductor from other conductors in regard to the second conductors 17X1, 17X2, . . . , and 17Xn, the conductor will be referred to as a second conductor 17X.

The coordinate data formation circuit 400 includes a selection circuit 401 as an input/output interface with the sensor 1BX, an amplification circuit 402, a bandpass filter 403, a wave detection circuit 404, a sample hold circuit 405, an analog to digital (AD) conversion circuit 406, and a process control circuit 407.

The selection circuit 401 selects one conductor 16Y or 17X from the first conductor set 16 and the second conductor set 17 based on a control signal from the process control circuit 407. The conductor selected by the selection circuit 401 is connected to the amplification circuit 402 and the signal from the electronic pen 9 is detected by the selected conductor and amplified by the amplification circuit 402. The output of the amplification circuit 402 is supplied to the bandpass filter 403 and only components at the frequency of the signal transmitted from the electronic pen 9 are extracted.

The output signal of the bandpass filter 403 is detected by the wave detection circuit 404. The output signal of the wave detection circuit 404 is supplied to the sample hold circuit 405, sample-held with prescribed timing according to a sampling signal from the process control circuit 407, and thereafter converted by the AD conversion circuit 406 into a digital value. The digital data from the AD conversion circuit 406 is read and processed by the process control circuit 407.

The process control circuit 407 operates to transmit control signals individually to the sample hold circuit 405, the AD conversion circuit 406, and the selection circuit 401 according to a program stored in an internal read-only memory (ROM). The process control circuit 407 calculates positional coordinates on the sensor 1BX indicated by the electronic pen 9 from the digital data supplied from the AD conversion circuit 406.

Specifically, the process control circuit 407 first supplies the selection circuit 401 with a selection signal for successively selecting the second conductors 17X1 to 17Xn, for example, and reads data outputted from the AD conversion circuit 406 as a signal level when each of the second conductors 17X1 to 17Xn is selected. When none of the signal levels of the second conductors 17X1 to 17Xn reaches a prescribed value, the process control circuit 407 determines that the electronic pen 9 is not on the sensor 1BX and repeats the control for successively selecting the second conductors 17X1 to 17Xn.

When a signal at a level higher than or equal to the prescribed value is detected from one of the second conductors 17X1 to 17Xn, the process control circuit 407 memorizes the number of a second conductor 17X from which the highest signal level is detected and the numbers of multiple second conductors 17X in the vicinity of the former second conductor 17X. Then, the process control circuit 407 controls the selection circuit 401 to successively select the first conductors 16Y1 to 16Ym and reads the signal levels from the AD conversion circuit 406. At that time, the process control circuit 407 memorizes the number of a first conductor 16Y from which the highest signal level is detected and the numbers of multiple first conductors 16Y in the vicinity of the former first conductor 16Y.

Then, the process control circuit 407 detects the position on the sensor 1BX indicated by the electronic pen 9 based on the number of the second conductor 17X from which the highest signal level is detected, the number of the first conductor 16Y from which the highest signal level is detected, and the multiple second conductors 17X and first conductors 16Y in the vicinity memorized as above. Coordinate data representing the position on the sensor 1BX detected as above is supplied from the process control circuit 407 to the controller 200 and transmitted to the external electronic device via the transmission antenna AT provided in the antenna assembly 200A of the controller 200.

As described above, the coordinate input device according to the present disclosure can be implemented also when a coordinate sensor 1SX of the capacitive type and an electronic pen 9 corresponding to the coordinate sensor 1SX are used.

Effects of Embodiments

In the coordinate input devices of the embodiments described above, the whole of the surface of the sensor 1B opposite to the side facing the electronic pen 2 is covered with the shield sheet 1C. By placing the shield sheet 1C in between, the controller 200 as a signal source can be arranged in the vicinity of the sensor 1B to face the sensor 1B. Accordingly, the downsizing of the coordinate input device can be promoted since it is unnecessary to separate the controller 200 and the sensor 1B from each other in terms of distance. The transmission antenna AT connected to the controller 200 is arranged outside the region covered with the shield sheet 1C. With this configuration, the coordinate data, etc. that should be transmitted to the external electronic device can be appropriately transmitted to the external electronic device without being screened out by the shield sheet 1C.

The controller 200 can be configured as a circuit board in which the principal part provided with the CPU 201, the memory 202, the transmitter 203, etc. and the transmission antenna are integrated together as explained with reference to FIGS. 3A and 3B. In this case, as explained with reference to FIGS. 3A and 3B, the transmission antenna is provided in the antenna assembly 200A formed to protrude from part of the controller 200 configured as a circuit board. With this configuration, the principal part of the controller 200 can be arranged in the vicinity of the sensor 1B across the shield sheet 1C, and the transmission antenna AT can be arranged to be situated outside the region covered with the shield sheet.

The coordinate input device is configured to transmit the coordinate data detected by the sensor 1B to the external electronic device via the memory (storage). With this configuration, countermeasures such as retransmission can be taken in case of trouble. Further, it is possible to successively accumulate the coordinate data in the memory (storage) and to transmit the accumulated coordinate data to the external electronic device all at once when the operation button 207 is operated. Accordingly, it is possible, for example, to transmit coordinate data regarding one page, corresponding to handwriting on one page of a notepad, to the external electronic device all at once.

Since the coordinate data are transmitted by using radio waves, the data transmission and reception can be carried out reliably compared to wireless transmission using infrared rays. Further, since the whole of the surface of the sensor 1B opposite to the surface facing the electronic pen 2 is covered with the shield sheet 1C, it is possible to arrange also the battery, the coordinate data formation, etc. in the vicinity of the sensor 1B to face the sensor 1B across the shield sheet 1C. With this configuration, further downsizing of the coordinate input device can be realized.

A manipulandum for switching the on/off of the supply of the electric power can be provided integrally with the controller 200. This makes it possible to simplify the configuration of the coordinate input device. The electronic pen attachment part provided on the coordinate input device prevents loss of the electronic pen when it is not used. The clip 1x provided as the attachment part for a notepad (handwriting record medium) makes it possible to use the coordinate input device together with the notepad.

Providing the electronic pen with the function of being capable of leaving handwriting (ballpoint pen function) makes it possible to simultaneously perform the recording of the handwriting on the notepad and the inputting of the coordinate data corresponding to the handwriting. With this configuration, thanks to the simultaneously inputted coordinate data, the coordinate data (electronic data) corresponding to the handwriting recorded on the notepad can be used without the trouble of scanning the handwriting on the notepad by using a scanner or the like.

The coordinate input devices 5 and 5A of the cover type can easily be used in combination with the tablet PC 6 as explained with reference to FIGS. 7 and 8. Further, the transmission antenna AT of the controller 200 is provided to be situated on the side where the tablet PC used in combination is mounted. With this configuration, the coordinate data from the coordinate sensor 1s can be communicated reliably between the coordinate input device and the tablet PC used adjacently. Furthermore, since the cover type coordinate input devices 5 and 5A can be folded in half, a configuration convenient to carry can be realized while also protecting the tablet PC used in combination.

Since sensors of the electromagnetic induction type, the electromagnetic resonance type, and the capacitive type can be used as the coordinate sensor, the variety of the actual configuration and mode of the coordinate input device can be increased. Accordingly, an appropriate type of coordinate sensor can be selected according to conditions such as purpose and cost.

Modifications

While the controller 200 was described to have the function of transmitting the coordinate data to an external electronic device in the above embodiments, the controller 200 is not limited to such examples. For example, the controller 200 may also be configured to have a transmission/reception function and to bidirectionally perform communication with the external electronic device. With this configuration, when the coordinate data is not received appropriately on the external electronic device's side, for example, retransmission of the coordinate data can be requested and carried out.

It is also possible to configure the external electronic device to transmit a coordinate data supply request and the coordinate input device 1, 5, or 5A to transmit the coordinate data in response to the supply request. In this case, it is desirable to install software for implementing such a function in the external electronic device and the controller 200 of the coordinate input device 1, 5, or 5A.

While the power is turned on/off through the operation button in the above embodiments, the part to be turned on can be divided into some parts. For example, the need of transmitting the coordinate data does not arise when there is no targeted external electronic device in the close vicinity. Thus, it is also possible to set a mode in which the power is not supplied to components implementing the transmission function such as the transmitter 203 and a mode in which the power is supplied to the entire device and to selectively use these modes appropriately depending on the situation.

For example, control for turning on the power can be carried out in such a manner that the power is supplied not to circuitry implementing the transmission function but to the other circuitry when the operation button is depressed once and the power is supplied to the entire circuitry when the operation button is depressed twice. In this case, the power supply mode is indicated to the user in a way like lighting the LED 208 alone when the transmission function is not activated and lighting the LEDs 208 and 209 when the power is supplied to the entire device. It is also possible to notify the user that the device is in the state of transmitting coordinate data by performing control like making the LEDs 208 and 209 blink at the time of transmitting coordinate data, for example.

While examples of using the coordinate input device and a tablet PC in combination are described in the above embodiments, the combined use of the coordinate input device is not limited to such examples. The coordinate input device 1, 5, or 5A is usable in combination with not only a tablet PC but also various types of electronic devices having a wireless communication function employing the same communication method. For example, the coordinate input device according to the present disclosure is also usable in combination with a desktop personal computer, a notebook personal computer, a highly functional cellular phone terminal called a smartphone or the like, and so forth.

DESCRIPTION OF REFERENCE SYMBOLS

1—Coordinate input device, 1A—Top cover (top plate), 1B, 1BX—Sensor, 1C—Shield sheet, 1D—Sensor cover, 1S, 1SX—Coordinate sensor, 1X—Clip, 100, 400—Coordinate data formation circuit, 200—Controller, 200A—Antenna assembly, 200U—User I/F, 200C—IF, 201—CPU, 202—Memory, 203—Transmission, 204—USB terminal, 205—Battery terminal, 206—Connection terminal, 207—Operation button, 208, 209—LED, 300—Battery, 5, 5A—Cover type coordinate input device, 51—Coordinate sensor assembly, 52, 52A—Tablet PC mount, 53—Spine, 54—Electronic pen attachment, 55—Hook, 56—Band, 57—Holder, 58—Sleeve, 2, 9—Electronic pen, 3—Notepad, 8—Binder

The invention claimed is:

1. A coordinate input device comprising:
a sensor which, in operation, detects coordinates corresponding to a position indicated by an electronic pen;
a top plate that covers an input surface of the sensor facing the electronic pen;
a shield sheet having electrical conductivity and magnetic properties that is provided to cover a whole of a surface of the sensor opposite to the input surface of the sensor;
a coordinate data formation circuit which, in operation, forms coordinate data based on detection output of the sensor in response to an operation input via the top plate; and
a controller that is connected with a transmission antenna and that faces the sensor with the shield sheet disposed between the sensor and the controller,
wherein the controller, in operation, performs control to hold the coordinate data formed by the coordinate data formation circuit and to wirelessly transmit the coordinate data to an external device,
wherein the controller is arranged inside of a region covered with the shield sheet,
wherein the top plate is foldable in half,
wherein the sensor is arranged on a first side of two sides of the top plate that face each other when the top plate is folded in half, and
wherein a storage area in which an electronic device is stored is provided on a second side of the two sides of the top plate that face each other when the top plate is folded in half.

2. The coordinate input device according to claim 1, further comprising:
a storage that accumulates the coordinate data formed by the coordinate data formation circuit,
wherein the controller, in operation, performs control to transmit the coordinate data accumulated in the storage to the external device.

3. The coordinate input device according to claim 2, wherein the controller is connected with at least an operation button arranged outside of the region covered with the shield sheet, and
wherein the controller, in operation, performs control to transmit the coordinate data accumulated in the storage when the operation button is operated.

4. The coordinate input device according to claim 1, wherein the controller, in operation, performs control to transmit the coordinate data by using radio waves.

5. The coordinate input device according to claim 1, wherein a battery supplying power to the coordinate data formation circuit and the controller is arranged facing the sensor with the shield sheet disposed between the sensor and the battery supplying power to the coordinate data formation circuit.

6. The coordinate input device according to claim 1, wherein the sensor is attachable to and detachable from the top plate.

7. The coordinate input device according to claim 1, wherein a handwriting record medium attachment clip that enables a handwriting record medium to be attached is provided on the input surface of the sensor facing the electronic pen.

8. The coordinate input device according to claim 7, further comprising:
an electronic pen attachment part that attaches the electronic pen to the coordinate input device.

9. The coordinate input device according to claim 7, wherein the electronic pen has a lead body configured to leave handwriting on the handwriting record medium.

10. The coordinate input device according to claim 9, wherein:
the controller is connected with an operation button or a light emitting diode (LED) arranged outside of a region covered with the shield sheet, and
the operation button or the LED is disposed on the top plate on which the handwriting record medium is disposed when the handwriting record medium is attached to the coordinate input device.

11. The coordinate input device according to claim 1, wherein the electronic device includes a receiver which, in operation, receives a signal transmitted from the transmission antenna, and
wherein the transmission antenna is arranged on the second side of the two sides of the top plate that face each other when the top plate is folded in half.

12. The coordinate input device according to claim 11, wherein the transmission antenna connected with the controller is provided adjacent to a part of the top plate along which the top plate folds in half.

13. The coordinate input device according to claim 11, wherein the transmission antenna connected with the controller is provided in a center part of the top plate.

14. The coordinate input device according to claim 1, wherein the electronic device has a receiver which, in operation, receives a signal transmitted from the transmission antenna.

15. The coordinate input device according to claim 1, wherein the sensor is of an electromagnetic induction type.

16. The coordinate input device according to claim 1, wherein the sensor is of an electromagnetic resonance type that cooperates with the electronic pen.

17. The coordinate input device according to claim 1, wherein the sensor is of a capacitive type.

18. The coordinate input device according to claim 1, wherein the controller is connected with an operation button or a light emitting diode (LED) arranged outside of a region covered with the shield sheet,
wherein the controller is connected with at least the LED arranged outside of the region covered with the shield sheet, and
wherein the controller, in operation, lights up the LED during a transmission of the coordinate data and extinguishes the LED after the transmission of the coordinate data is complete.

19. The coordinate input device according to claim 1, wherein the controller is connected with an operation button or a light emitting diode (LED) arranged outside of a region covered with the shield sheet,
wherein the controller is connected with the operation button and the LED arranged outside of the region covered with the shield sheet,
wherein the controller, in operation, performs control to transmit the coordinate data when the operation button is operated, and
wherein the controller, in operation, lights up the LED during a transmission of the coordinate data and extinguishes the LED after the transmission of the coordinate data is complete.

* * * * *